United States Patent [19]

Hartman

[11] Patent Number: 5,247,699
[45] Date of Patent: Sep. 21, 1993

[54] CELLULAR FREQUENCY REUSE CELL PLAN

[75] Inventor: Paul A. Hartman, Plano, Tex.

[73] Assignee: Telefonaktiebolaget L M Ericsson, Stockholm, Sweden

[21] Appl. No.: 508,921

[22] Filed: Apr. 12, 1990

[51] Int. Cl.[5] .................... H04Q 7/00; H04M 11/00
[52] U.S. Cl. .................................... 455/33.1; 379/59; 379/60; 455/33.3
[58] Field of Search ............... 455/33, 33.1, 33.2, 455/33.3, 33.4; 379/58-60

[56] References Cited

U.S. PATENT DOCUMENTS

| | | | |
|---|---|---|---|
| 3,898,390 | 8/1975 | Wells et al. | 379/59 |
| 4,128,740 | 12/1978 | Graziano | 455/33 |
| 4,144,496 | 3/1979 | Cunningham et al. | 379/60 |
| 4,485,486 | 11/1984 | Webb et al. | 455/33 |
| 4,670,899 | 6/1987 | Brody et al. | 379/60 |
| 4,723,266 | 2/1988 | Perry | 379/60 |
| 4,736,453 | 4/1988 | Schloemer | 455/33 |
| 4,771,448 | 9/1988 | Koohgoli et al. | 379/60 |

Primary Examiner—Reinhard J. Eisenzopf
Assistant Examiner—Andrew Faile
Attorney, Agent, or Firm—Johnson & Gibbs

[57] ABSTRACT

A frequency reuse plan for a cellular radio communications system includes a plurality of antenna sites which implement twelve groups of frequencies among four antenna sites. The same frequencies are reused by other groups of four antenna sites. Each antenna site serves three hexagon shaped cells arranged in a clover-leaf shaped pattern by three groups of antennas, each of which group is separated by a pointing angle of 120 degrees.

13 Claims, 15 Drawing Sheets

FIG. 3
(PRIOR ART)
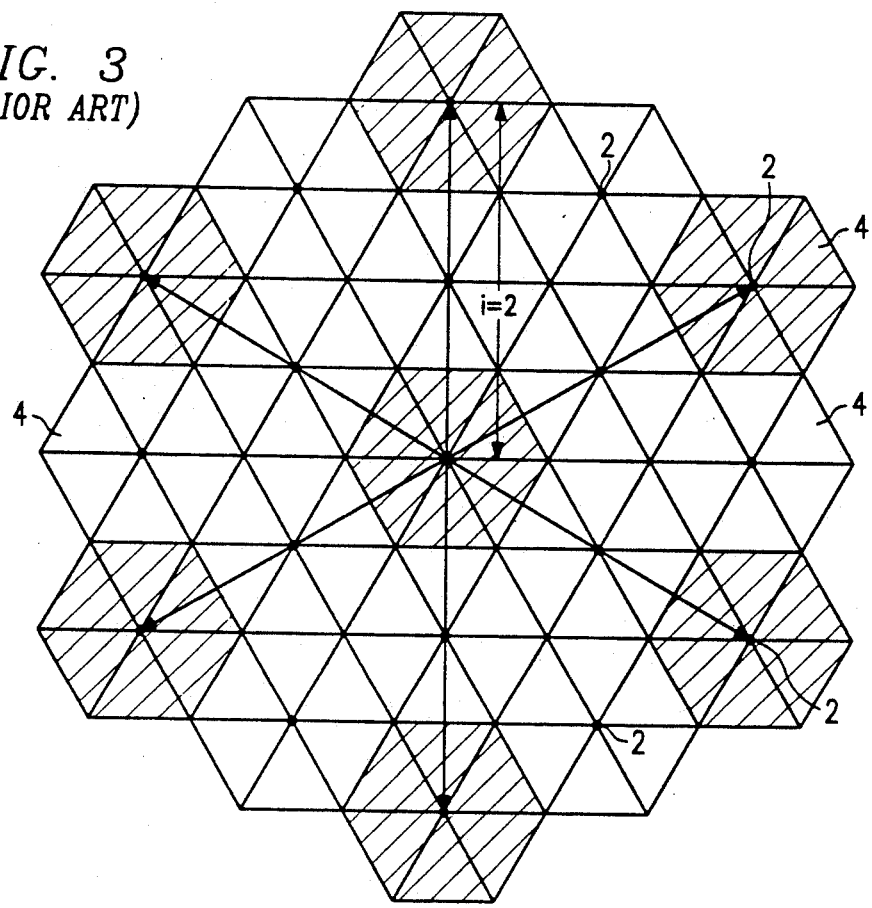
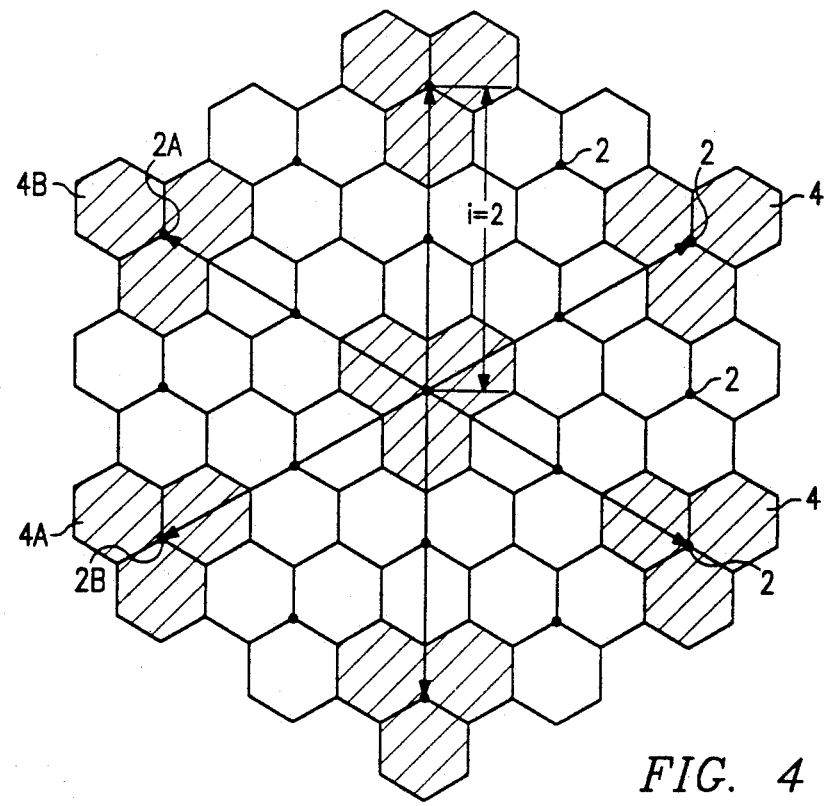
FIG. 4

ERICSSON CELL GEOMETRY

BELL CELL GEOMETRY

MOTOROLA CELL GEOMETRY

KEY:
L13—USE LOWER 13 CHANNELS OF FREQUENCY GROUP.
U13—USE UPPER 13 CHANNELS OF FREQUENCY GROUP.

KEY:
SUBSCRIPT 7=7/21 GROUPS

FIG. 24

KEY:
SUBSCRIPT.
  0 = PRIMARY SITE.
  1 = FIRST LEVEL CELL SPLIT.
  2 = SECOND LEVEL CELL SPLIT.

KEY:
SUBSCRIPT 4=4/12 GROUPS
7=7/21 GROUPS

KEY:
SUBSCRIPT 4=4/12 GROUPS

CELLULAR FREQUENCY REUSE CELL PLAN

BACKGROUND OF THE INVENTION

1. Field of the Invention

The present invention relates to cellular communications systems and, more particularly, to a frequency reuse plan therefor.

2. Description of the Related Art

Frequency reuse is the use of radio channels on the same carrier frequency for the coverage of geographically different areas and is necessary in order to construct practical, high-capacity cellular systems in traffic-dense areas, such as big cities. Needless to say, these geographically different areas which include the same radio carrier frequencies must be far enough apart to ensure that co-channel interference either does not arise or does not arise to an objectional level.

An important measurable characteristic of frequency reuse schemes is carrier-to-interference ratio ("C/I ratio"). The C/I ratio is defined to be the ratio of the level of the received desired signal to the level of the received undesired signal. Because of irregular terrain and the various shapes, types and numbers of local scatterers, the C/I ratio is dependent upon the instantaneous position of a mobile moving through a cell. Other factors such as antenna type, directivity and height, site elevations and positions, and the number of local interferers also affect the C/I ratio at various locations within a system.

The desired distribution of the C/I ratio in a system determines the number of frequency groups, F, which may be used. If the total allocation of N channels is partitioned into F groups, then each group will contain N/F channels. Since the total number of N channels is fixed, for example, there are 312 voice channels in the F.C.C. Standard A Band, a smaller number of F frequency groups would result in more channels per set and per cell site. Therefore, a reduction in the number of frequency groups would allow each site to carry more traffic, reducing the total number of sites needed for a given traffic load. However, decreasing the number of frequency groups and reducing the co-channel reuse distance results in a lower C/I distribution in the system.

FIGS. 1-3 are schematic illustrations of various prior art frequency reuse plans. In viewing these depictions, as well as all other illustrated frequency reuse plans, it should be appreciated that the illustrated cells are shown to have certain shapes. While in theory, cells may be envisioned as having any regular polygon shape, the important point is that the array of cells covers a plane without gaps or overlaps. Similarly, cell boundaries may be conceptually defined as lines at which the respective signal strengths of neighboring cells are equal. In reality, of course, because of such factors as random propagation effects, real cells only roughly approximate ideal cell shapes with ideal boundaries therebetween.

In considering the frequency reuse plans shown herein, it should be appreciated that equivalent site coverage areas, the same site locations, and 312 available voice channels are assumed in each plan. This reflects reality and allows fair comparisons to be made among the various plans.

Referring now to FIG. 1, there is shown a diagram of a 7/21 Cloverleaf Cell Plan as has heretofore been implemented by Ericsson, the assignee of the present invention. If may be seen that this plan employs a number of sites 2, each site serving three cells (or "sectors") 4. Each cell 4 contains a dedicated antenna system, a control channel, a signal strength receiver, and voice channels. In FIG. 1, certain groups of co-channel cells, i.e., cells employing the same frequencies, are shown cross-hatched, e.g., cells 4A and 4B. Using the same terminology, sites 2A and 2B should be appreciated to be co-channel sites.

Further with respect to FIG. 1, it may be seen that site 2A is centrally located within the illustrated system and that the outlying sites are all shifted two (2) units in a first ("$i^{th}$") direction and one (1) unit in a second ("$j^{th}$") direction from the central site. Defining i and j as shift parameters, the illustrated plan may be considered to have shift parameters of two (2) and one (1) respectively. Shift parameters are important characteristics of frequency reuse plans and will therefore be discussed with respect to each plan described herein.

Recalling that there are 312 available voice channels in the F.C.C. Standard A Band, the 7/21 Cloverleaf Cell Plan shown in FIG. 1 uses some 21 frequency groups in its seven repeating sites with approximately (although averaging somewhat less) 15 channels per group.

Supporting the three cell configurations shown in FIG. 1, each cell has antenna pointing azimuths separated by some 120°. More specifically, in practice, each cell uses 60° transmit antennas and two (2) 60° diversity receive antennas with the same pointing azimuths.

Referring now to FIG. 2, shown therein is a Three Rhomb Cell Plan as has heretofore been implemented by numerous operators, including the companies of the Bell System. Sites, cells and shift paraments are similarly marked in FIG. 2 as they were in FIG. 1. Examining FIG. 2, it should be appreciated that the Bell 7/21 Three Rhomb Cell Plan uses 21 Frequency groups in a seven site reuse pattern with approximately 15 channels per group. As with the Ericsson 7/21 Cloverleaf Cell Plan, the shift parameters, i and j, are two (2) and one (1) respectively. Site geometry in the Bell plan involves three cells 4 or sectors at each site 2. The antenna pointing azimuths of each cell are separated by 120°. Each cell uses 120° transmit antennas and two (2) 120° diversity receive antennas with the same pointing azimuths. Additionally, each cell is approximated by the shape of a rhomboid.

Referring now to FIG. 3, shown therein is a 4/24 Six Triangle Cell Plan as has heretofore been implemented by Motorola. This plan uses 24 frequency groups in a four site reuse pattern with 13 channels per group. The corresponding shift parameters i and j are two (2) and zero (0), respectively. The site geometry involves six cells 4 at each site 2 with antenna pointing azimuths separated by 60°. Each cell uses one (1) 60° antenna with the transmit and receive functions duplexed. Additionally, each cell is approximated by the shape of an equilateral triangle.

Further details regarding each of the above plans will be set forth below in various comparisons with the plan according to the present invention. In general however, it may be noted and should be appreciated by those skilled in the art that each of the prior art systems possesses shortcomings in that a number of important system characteristics; e.g., C/I performance, capacity, utilization, and site position tolerance, could be improved.

SUMMARY OF THE INVENTION

Accordingly, it is an object of the present invention to provide a frequency reuse plan having improved C/I, capacity, utilization, and site performance tolerance than prior art plans.

To fulfill the above and other objects, and to overcome the shortcomings and deficiencies of the prior art, the present invention provides a cellular radio communications system including a plurality of sites wherein groups of four sites reuse frequencies. The system includes means for implementing twelve groups of frequencies among the plurality of sites with each of the twelve groups of frequencies including twenty-six channels.

Embodiments of the frequency reuse plan according to the teachings of the present invention has shift parameters, i and j, of two (2) and zero (0), respectively.

Embodiments of the plan of the present invention may further include groups of three cells which surround each site. These cells may be hexagon-shaped and, further, may be arranged in a cloverleaf fashion.

Still further, in other embodiments of the present invention each cell may have antenna pointing azimuths, each of which may be separated by approximately 120°. Yet still further, each cell may include 60° transmit antennas and two diversity receive antennas with the same pointing azimuths.

BRIEF DESCRIPTION OF THE DRAWINGS

For a more complete understanding of the present invention, and for further objects and advantages thereof, reference may now be had to the following description taken in conjunction with the accompanying drawings in which:

FIG. 3 depicts a prior art Motorola 4/24 "Six Triangle" Cell Plan, previously discussed;

FIG. 4 depicts a frequency reuse plan according to the teachings of the present invention;

FIG. 24 illustrates a pattern assignment for the allocation of control channels in a 4/12 cell plan utilizing a 1:3 cell splitting scheme;

DETAILED DESCRIPTION OF THE INVENTION

Figure 1:
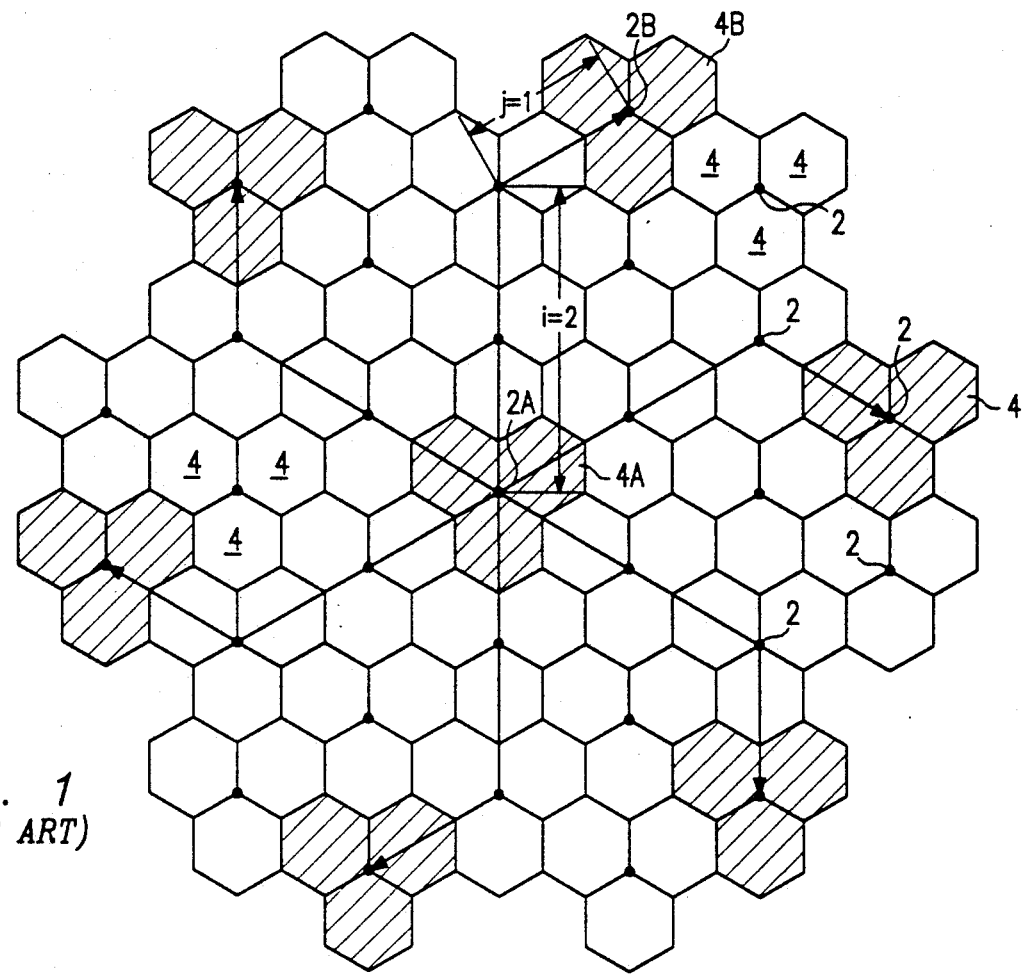
FIG. 1 depicts a prior art Ericsson 7/21 Cloverleaf Cell Plan, previously discussed.
Figure 2:
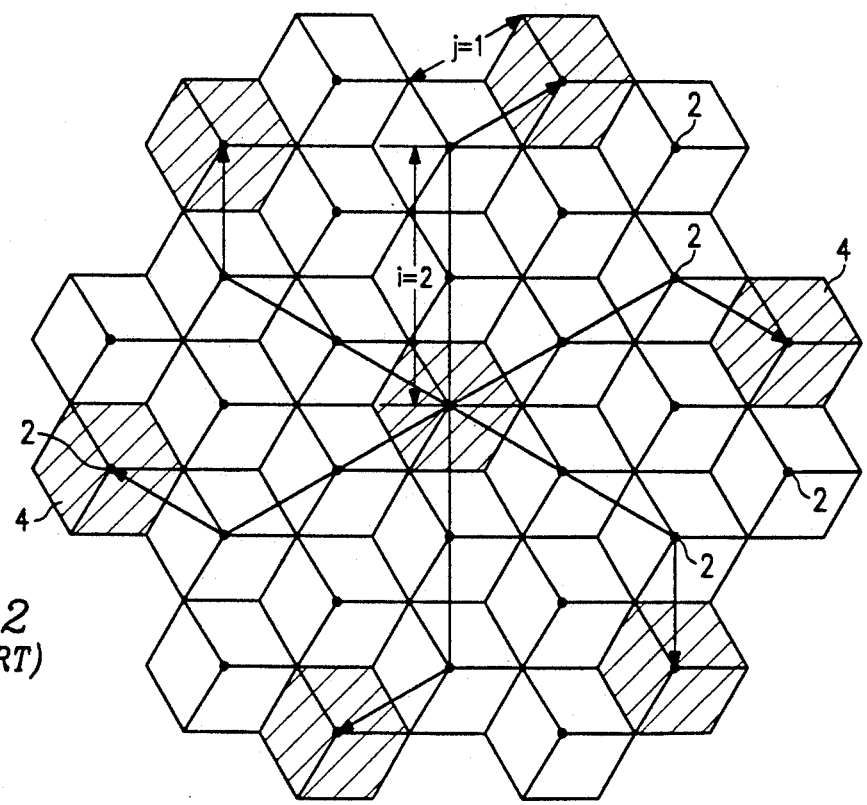
FIG. 2 depicts a prior art Bell 7/21 "Three Rhomb" Cell Plan, previously discussed.

Referring now to FIG. 4, a frequency reuse plan according to the teachings of the present invention is shown therein. This plan uses twelve (12) frequency groups in a four (4) site reuse pattern with twenty-six (26) channels per group. The corresponding shift parameters may be seen to be two (2) and zero (0), respectively. Three (3) cells are at each site. The antenna pointing azimuths of each cell are separated by 120° and the cells are arranged in a cloverleaf fashion. Each cell uses 60° transmit antennas and two (2) 60° diversity receive antennas with the same pointing azimuths. Each cell is approximated by the shape of a hexagon.

Because of the use of twelve (12) frequency groups in a four (4) site reuse pattern and because of the cloverleaf arrangement of the cells, the plan according to the present invention and shown in FIG. 4 will, and for clarity and convenience, hereafter be identified as a 4/12 Cloverleaf Cell Plan.

To fully understand the capabilities of the present invention and the advantages it offers over the prior art, it is useful to consider traffic capacity, carrier-to-interference performance, and uplink system gain, each of which will be discussed below.

The three major blocking formulas, Poisson, Erlang B and Erlang C, differ in the basic assumptions made with regard to the behavior of calls failing to find an idle channel. With specific reference to the Poisson blocking formula, calls are willing to wait no longer than their intended or average holding times. If a channel becomes idle before the holding time expires, the call will seize it and use it for the remaining part or duration of its holding time. With respect to the Erlang B blocking formula, blocked calls which fail to find an idle channel immediately are not willing to wait and abandon the call immediately. Finally, with respect to the Erlang C blocking formula, blocked calls are willing to wait an indefinite period to obtain an idle channel.

It is common practice in the cellular industry to assume a loss system, that is, all blocked calls are cleared, when dimensioning the number of channels required per cell in a system. Therefore, the Erlang B blocking formula with a designed channel blocking probability of 2% is used as the standard.

With the above understandings, Table 1 below illustrates the traffic capacity per site for the frequency reuse plans discussed in the description of related art section as well as the reuse plan according to the present invention. The comparison illustrated in Table 1 assumes use of the Erlang B blocking formula with a blocking probability of 2%, 312 available voice channels, equivalent site coverage areas of 31.2 square kilometers, ideal site locations, and ideal cell boundaries.

good or excellent at a C/I of 17 dB. At 17 dB C/I, an optimized cellular system will provide voice quality equal to that of a toll call off the public telephone network.

A goal, therefore, of cellular network system designers is to provide acceptable voice quality uniformly throughout the service area. Due to the direct relationship between C/I performance, system capacity and system cost, a system operator usually specifies a required transmission quality for X percent of the subscribers rating the call quality good or better for Y percent of the coverage area.

It may be noted that a C/I ratio of greater than 12 dB is considered to be required for both quality voice conversation as well as bit error rate ("BER") performance within data transmission, synchronization and recognition for frequency modulated systems which use companders, limiters, and base station receive diversity.

Figure 6:
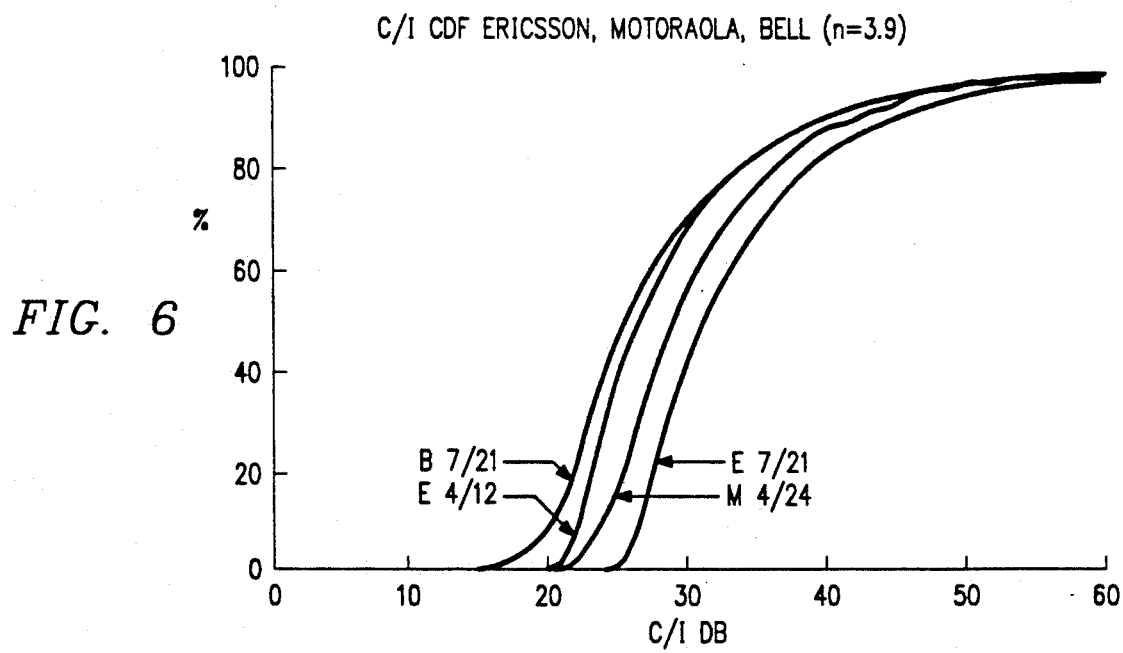
FIG. 6 is a graph comparing C/I performance of the four frequency reuse plans discussed herein.
Figure 7:
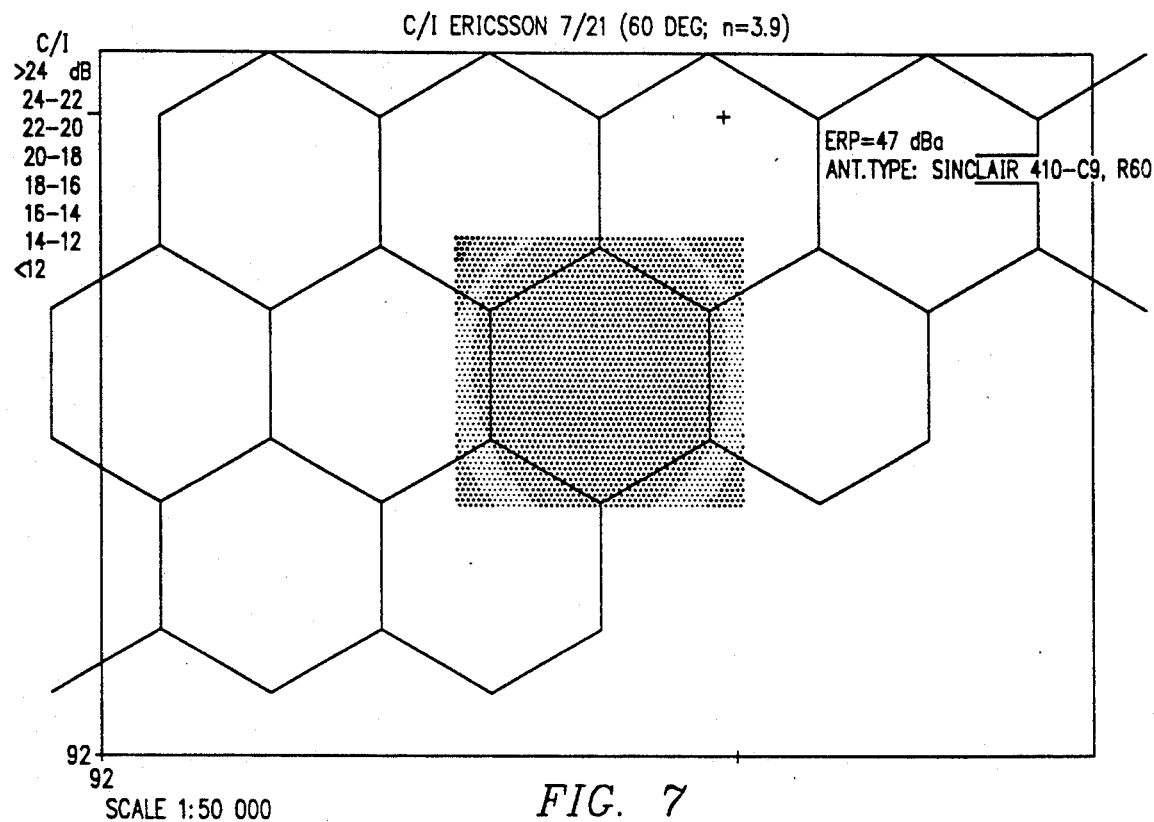
FIG. 7 illustrates C/I predictions for the Ericsson 7/21 Cloverleaf Cell Plan, which predictions were used to generate the graph shown in FIG. 6.
Figure 8:
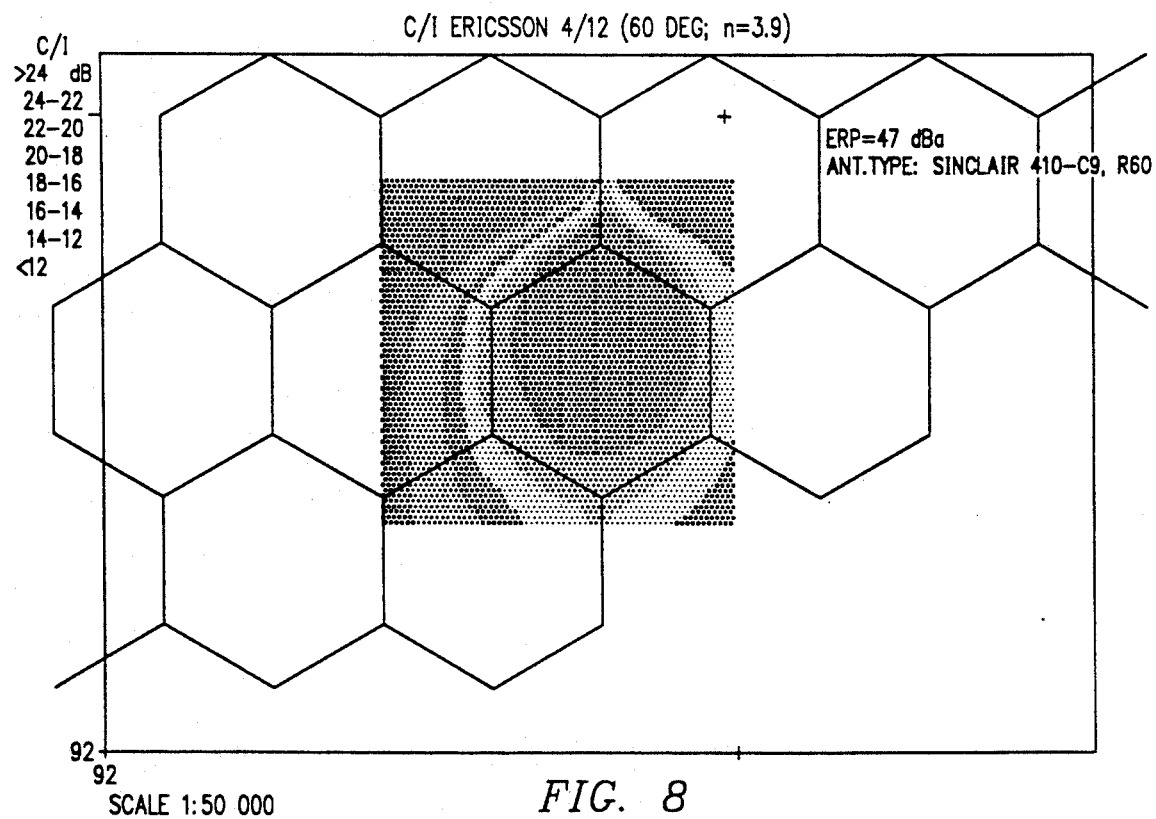
FIG. 8 illustrates C/I predictions for the Ericsson 4/12 Cloverleaf Cell Plan according to the teachings of the present invention, which predictions were used to generate the graph shown in FIG. 6.
Figure 9:
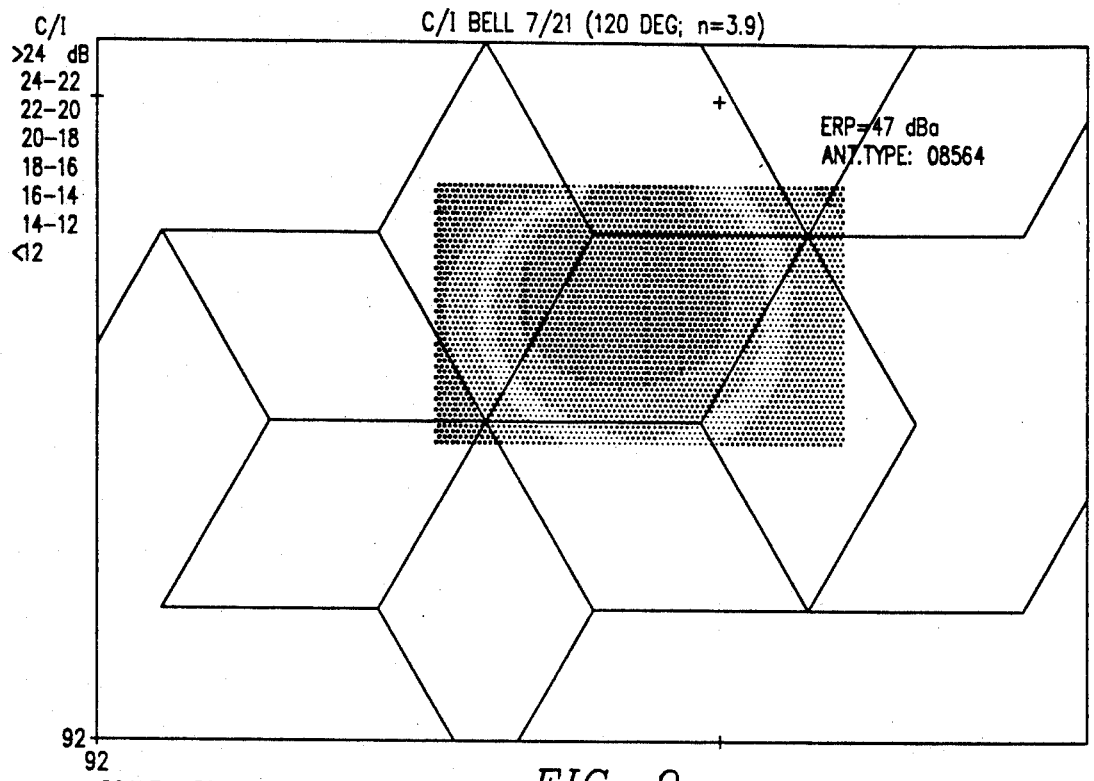
FIG. 9 illustrates C/I predictions for the Bell 7/21 "Three Rhomb" Cell Plan, which predictions were used to generate the graph shown in FIG. 6.
Figure 10:
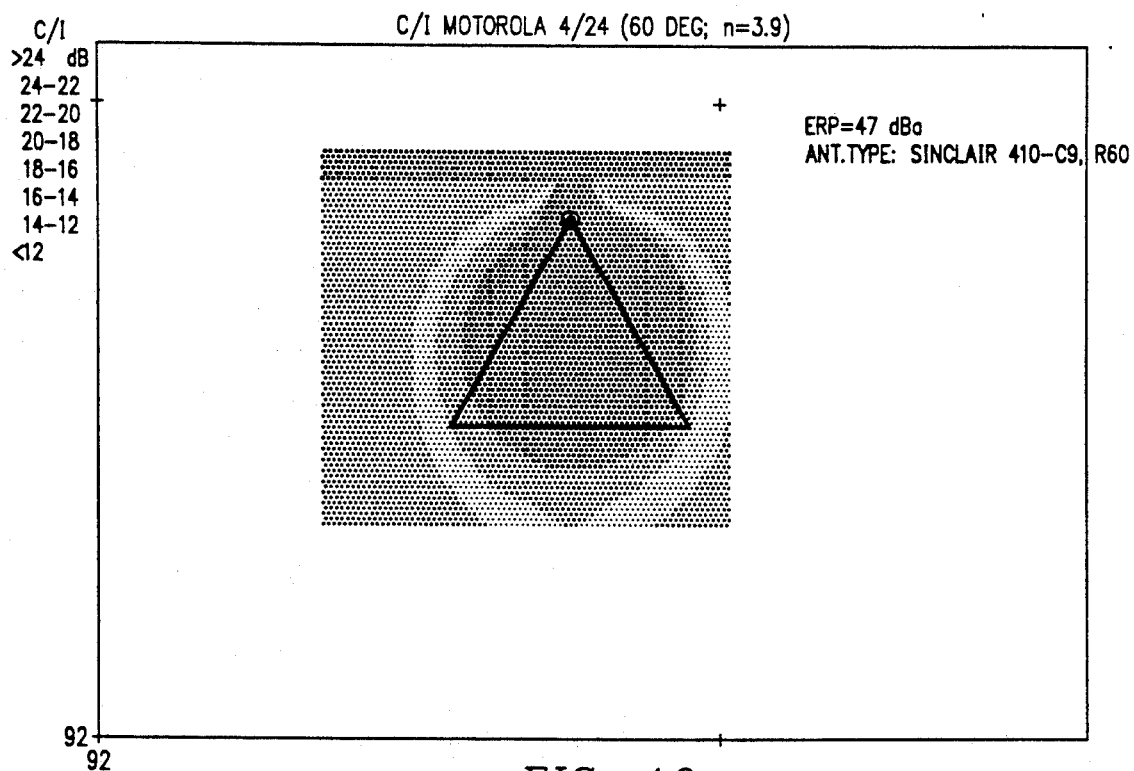
FIG. 10 illustrates C/I predictions for the Motorola 4/24 "Six Triangle" Cell Plan, which predictions were used to generate the graph shown in FIG. 6.

A comparison of the C/I performance of the prior art reuse plans and the reuse plan according to the present invention are shown in FIG. 6 which illustrates accumulative probability distribution curves. The evaluation of the C/I performance for the different frequency

TABLE 1

| FREQUENCY PLAN | | FREQUENCY GROUPS | CHANNELS PER SITE | CAPACITY/SITE (ERLANGS) | CAPACITY/SITE (ERLANGS/SQ KM) |
|---|---|---|---|---|---|
| ERICSSON | 7/21 | 21 | 44.6(3 × 14.9) | 26.7 | 0.86 |
| ERICSSON | 4/12 | 12 | 78.0(3 × 26) | 55.2 | 1.77 |
| BELL | 7/21 | 21 | 44.6(3 × 14.9) | 26.7 | 0.86 |
| MOTOROLA | 4/24 | 24 | 78.0(6 × 13) | 44.4 | 1.42 |

From Table 1 above it may be noted that the Ericsson 4/12 Cloverleaf Cell Plan provides an increase in traffic capacity per site of 106% over both the Bell and Ericsson 7/21 cell plans and 24.4% over the Motorola 4/24 cell plan. In reading the chart it should be noted, however, that a cell must have an integer number of voice channels. Because it is not possible to divide 312 voice channels into an integer number between 21 cells, the 7/21 cell plans in the comparison uses an average number of voice channels per call.

Based on the foregoing, it should be appreciated that the reuse plan according to the present invention offers tremendous advantages over prior art systems with respect to traffic capacity and therefore the number of sites required to serve a system.

Figure 5:
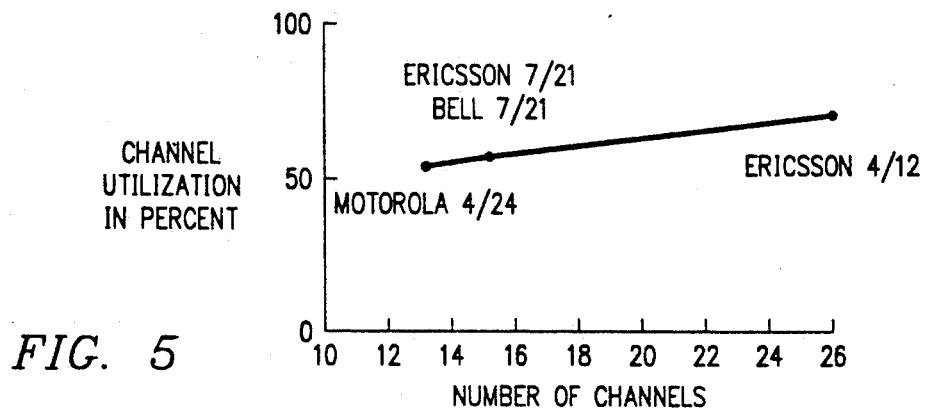
FIG. 5 is a graph comparing channel utilization of the four frequency reuse plans discussed herein.

Considering channel utilization of the respective systems, the relationship of channel group size vs. channel utilization for the different frequency reuse plans is shown in FIG. 5. The channel utilization shown in FIG. 5 has been calculated using the formula: "channel utilization (%)" equals "traffic capacity per cell" divided by "number of channels per call".

Examining FIG. 5, it may be noted that the channel utilization of the Ericsson 4/12 cell plan exceeds that of the Bell and Motorola cell plans by 10% and 13%, respectively. This increase is accomplished by utilizing a more efficient channel allocation scheme, that is, a larger number of voice channels per frequency group. Thus, with respect to channel utilization, the frequency reuse plan according to the teachings of the present invention constitutes a marked improvement in the art.

Carrier-to-Interference performance will now be considered. Co-channel interference and a multi-path fading environment has been evaluated heretofore in at least one subjective testing program. The results of this program showed that a majority of the listeners consider the transmission quality of the voice channel to be reuse plans assumes antennas of 120° for Bell and 60° for the two Ericsson and one Motorola systems. Antenna heights in all cases are assumed to be 50 meters. The propagation model employed in the Okamura/Hada, flat earth with no effect from the radio horizon. Site positions are assumed to be ideal as are the cell boundaries. The number of interferers was in all cases six (6). Finally, the effective radiated power was assumed to be equal for both the target and interfering cells.

The distribution curves illustrated in FIG. 6 were generated from the data illustrated in FIGS. 7–10 which show the position and level distribution of the predicted C/I values in the respective cells.

In examining FIG. 6, as well as FIGS. 7–10, it should be noted that the probability distribution curves and C/I predictions are predicted averages and do not include the effect of log-normal fading on the radio signal.

With respect to cell-site position tolerance, the level and distribution of the C/I ratio desired in a cellular system impacts on the position tolerance for locating cell sites. The Ericsson 7/21 cell plan design, for example, permits the cell site to be positioned up to one quarter of the nominal cell radius (15% of the site-to-site distance) from the ideal site location.

Figure 11:
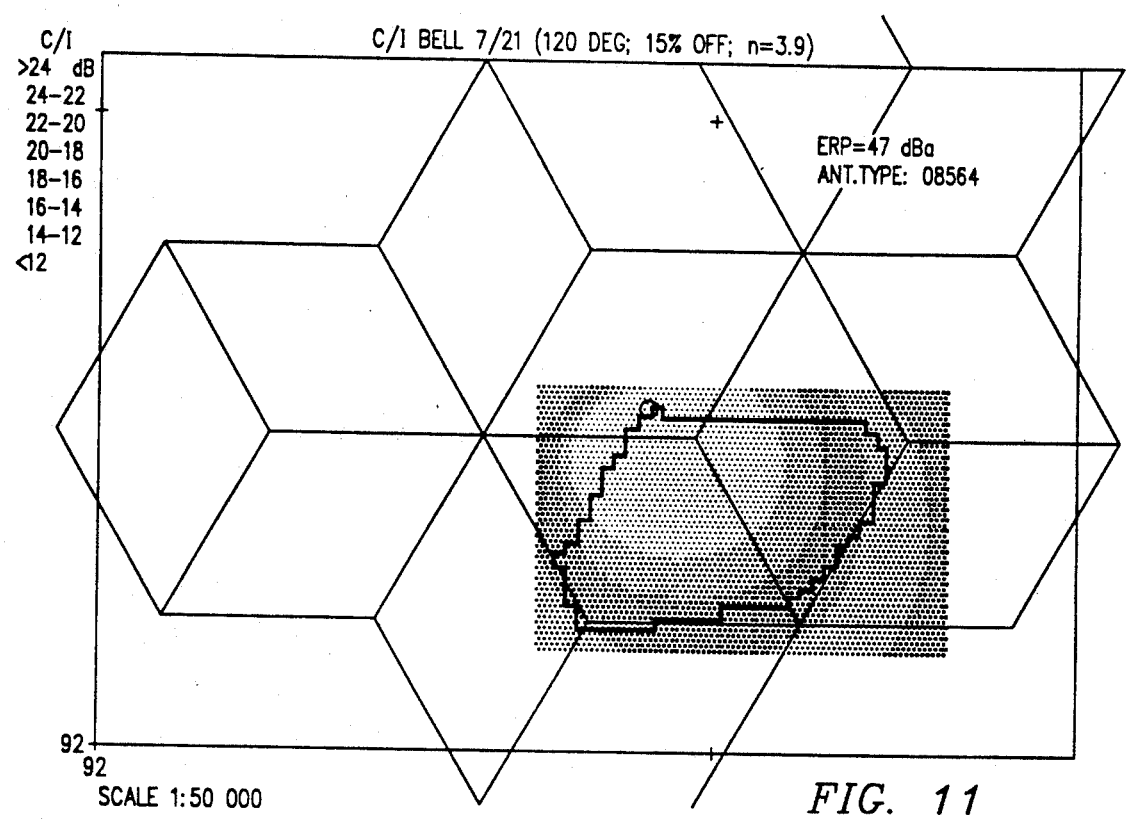
FIG. 11 depicts data relating to cell-site position tolerance of the Bell 7/21 "Three Rhomb" Cell Plan.
Figure 12:
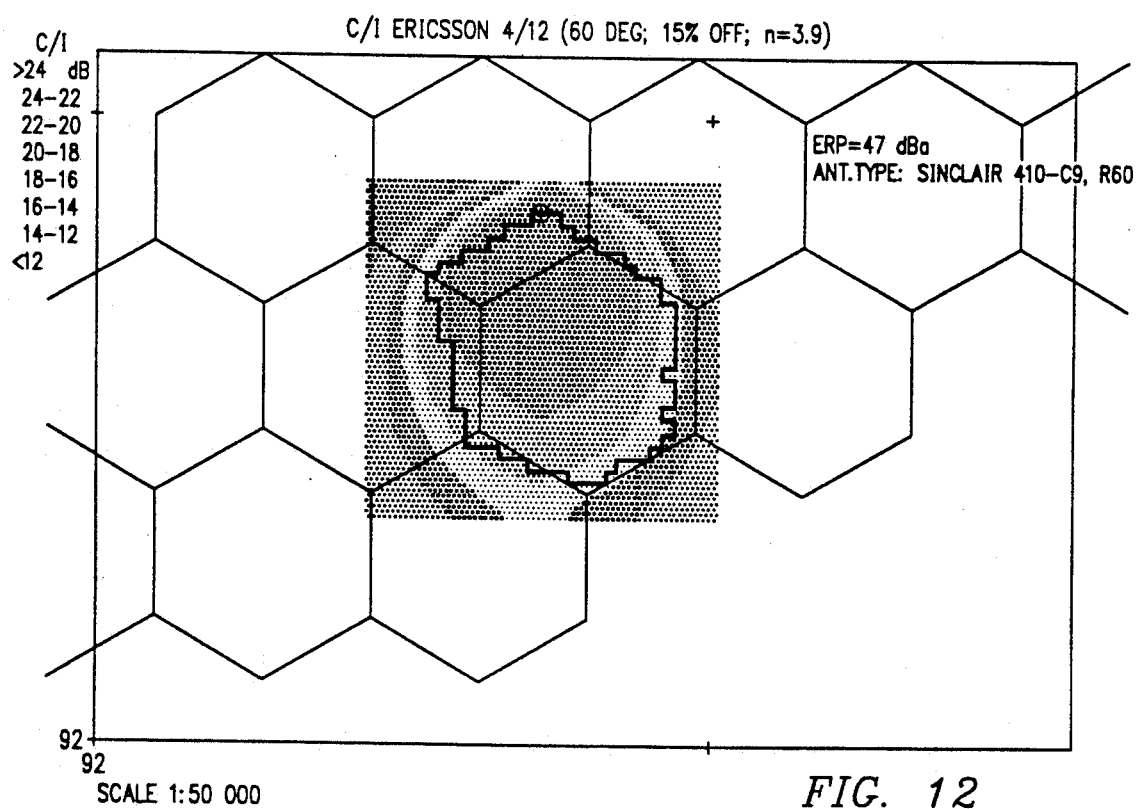
FIG. 12 depicts data relating to cell-site position tolerance of the Ericsson 4/12 Cloverleaf Cell Plan, an embodiment of the present invention.
Figure 13:
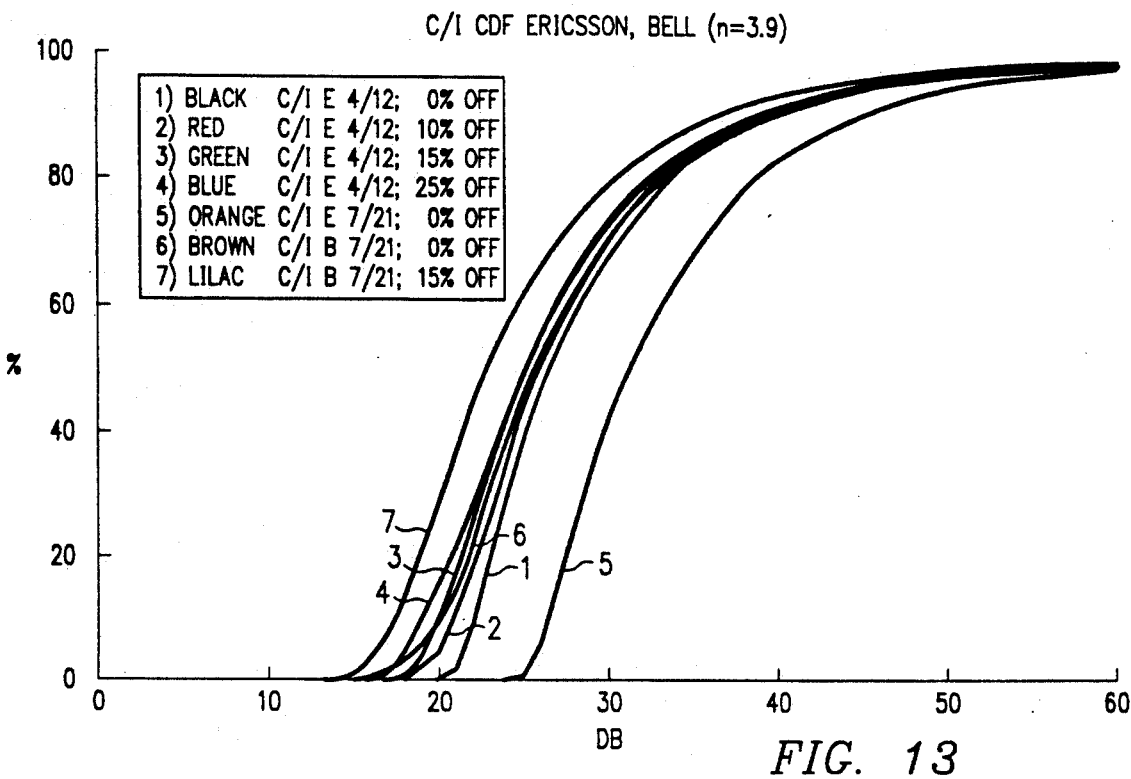
FIG. 13 depicts comparison data relating to cell-site position tolerance of the Bell 7/21 "Three Rhomb" Cell Plan and the Ericsson 4/12 Cloverleaf Cell Plan.

The assignee of the present invention has made a limited analysis of the cell-site position tolerance for the cell plan according to the present invention. The results of this analysis are shown in FIGS. 11–13. This analysis focused on the position tolerance which would provide an equivalent C/I distribution to the Bell 7/21 cell plan with an object site located 15% of the site-to-site distance from the nominal site position. The cell-site position tolerance was found to be more than 25% of the site-to-site distance in the 4/12 cell plan for equivalent C/I performance to the reference Bell 7/21 cell plan. However, the C/I distribution for a cell site in the 4/12 cell pattern located 25% of the site-to-site distance off grid is marginal. Therefore, a more conservative site position tolerance of 15% of the site-to-site distance is recommended for inclusion in preferred embodiments of the present invention. Adherence to this position tolerance will provide for a more favorable C/I distribution in the system. In considering the data shown in FIGS. 11-13, it may be noted that the site-to-site distance was used in the analysis due to the differing cell radii for the Bell 7/21 and Ericsson 4/12 cell plans.

Based on the foregoing, it should be appreciated that the cell plan according to the teachings of the present invention offers significant advantages relating to traffic capacity and C/I performance. It also offers significant advantages with respect to uplink system gain, as is discussed immediately below.

The uplink system gain is defined as the sum of the base station receive antenna gain, the diversity gain, and the relative distance gain in the mobile-to-base path. The diversity gain is a function of the incidence angle and the correlation coefficient of the signal received at the base station. That is: (Uplink Gain)=(Antenna Gain)+(Diversity Gain)+(Distance Gain).

Figure 17:
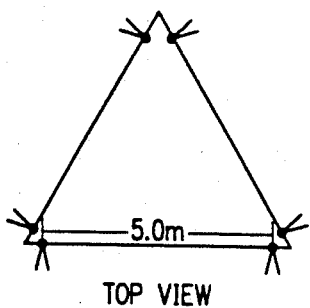
FIG. 17 is a top view of the antenna mounting arrangement used by the Ericsson and Bell systems.
Figure 18:
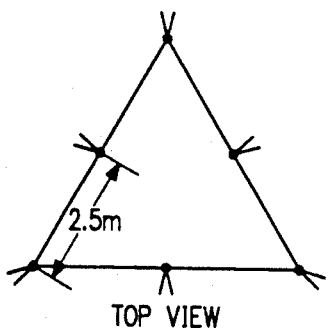
FIG. 18 is a top view of the antenna mounting arrangement used by the Motorola system.

The comparison of the four frequency reuse plans discussed herein has been undertaken. Before discussing the results of this comparison, it is important to note a number of assumptions that were made. A first assumption was that path loss is proportional to 39 log r, where r is the distance from the base station to the mobile. A second assumption was that the mobile involved in the comparison is located at the relevant cell boundary at an incidence angle to the base station of 0° to 60°. Third, with respect to the Ericsson and Motorola cell plans, the receive antenna gain for the 60° antennas is 17 dB, and further, the insertion loss (1 dB) associated with the use of duplex filters in the Motorola cell plan is subtracted from the receive antenna gain. It was also assumed that the receive antenna gain for the 120° antennas used in the Bell cell plan is 14 dB. Additionally, theoretical diversity gain for the Ericsson and Bell cell plans was assumed. Theoretical diversity gain for the Motorola cell plan minus the effect of unequal gain branches due to the 60° offset of receive antenna pointing azimuths, and a higher correlation of received signals due to a reduced antenna separation (see FIGS. 17 and 18) was assumed. Finally, a 30 meter tower with a triangular mounting platform which has standard 5 meter faces was also assumed. The antenna mounting arrangements for each cell plan shown and discussed above are shown in FIGS. 17 and 18. It should be noted that the distance gain for each cell plan is a relative value. The value is referenced to the Ericsson cell plan for a mobile located at the cell boundary with an incidence angle of 0°.

Figure 14:
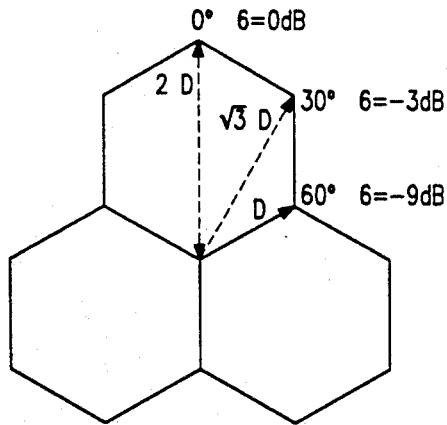
FIG. 14 shows the cell geometry and relative receive antenna gain for incident angles of 0°, 30°, and 60° for the Ericsson system.
Figure 15:
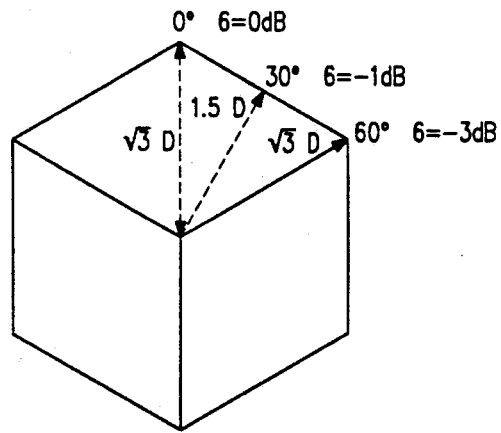
FIG. 15 shows the cell geometry and relative receive antenna gain for incident angles of 0°, 30°, and 60° for the Bell System.
Figure 16:
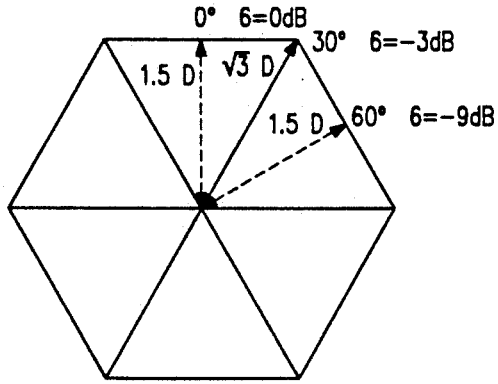
FIG. 16 shows the cell geometry and relative receive antenna gain for incident angles of 0°, 30°, and 60° for the Motorola system.

FIGS. 14 through 16 show the cell geometry and relative receive antenna gain for incidence angles of 0°, 30°, and 60° for the Ericsson, Bell and Motorola cell plans, respectively.

Based on the foregoing, an uplink system gain comparison was made and the results of that comparison are shown in Table 2 below.

TABLE 2

| CELL PLAN | INCIDENCE ANGLE | GAIN(Db) ANTENNA | GAIN(dB) DIVERSITY | GAIN(dB) DISTANCE | GAIN(dB) TOTAL |
|---|---|---|---|---|---|
| ERICSSON | 0° | 17 | 10 | 0 | 27 |
|  | 30° | 14 | 10 | 2 | 26 |
|  | 60° | 8 | 9 | 11 | 28 |
| BELL | 0° | 14 | 8 | 2 | 24 |
|  | 30° | 13 | 8 | 4 | 25 |
|  | 60° | 11 | 7 | 2 | 20 |
| MOTOROLA | 0° | 16 | 7 | 4 | 27 |
|  | 30° | 13 | 10 | 2 | 25 |
|  | 60° | 16 | 7 | 4 | 24 |

It should now be appreciated that the frequency reuse plan according to the present invention offers excellent traffic capacity, carrier-to-interference performance, and uplink system gain characteristics. It is now appropriate to discuss implementation of an Ericsson 4/12 Cell Plan. Such implementation is discussed immediately below with special reference to frequency planning aspects, voice channel assignment aspects, control channel assignment aspects, retune scheme aspects, and cell splitting aspects, each which topic is appropriately headed.

IMPLEMENTATION OF AN ERICSSON 4/12 CELL PLAN

The Ericsson 4/12 cell plan may be implemented in an existing system and frequency plan or during the initial system planning and design of a new system.

Frequency Planning

Optimal frequency planning requires that channel assignment and channel deployment in cells be based upon required cell capacity and C/I considerations. The degree of foresight with which the channel sets are defined and used can affect the system's transmission quality, cost, and ease of adaptation of growth.

Voice Channel Assignment

The Ericsson 4/12 cell plan uses four (4) repeated cell designators, with each designator divided into three (3) frequency groups. These three (3) frequency groups, each assigned to an appropriate sector at a site, may contain 1/12 of the total number of a system's allocated voice channel frequencies. The 4/12 frequency groups are illustrated in Table 3 for the standard FCC a Band. The frequency group allocation for the FCC Extended Band and TACS may be derived in a similar manner as outlined in Table 3 below:

TABLE 3

| A1 | B1 | C1 | D1 | A2 | B2 | C2 | D2 | A3 | B3 | C3 | D3 |
|---|---|---|---|---|---|---|---|---|---|---|---|
| 312 | 311 | 310 | 309 | 308 | 307 | 306 | 305 | 304 | 303 | 302 | 301 |
| 300 | 299 | 298 | 297 | 296 | 295 | 294 | 293 | 292 | 291 | 290 | 289 |
| 288 | 287 | 286 | 285 | 284 | 283 | 282 | 281 | 280 | 279 | 278 | 277 |
| 276 | 275 | 274 | 273 | 272 | 271 | 270 | 269 | 268 | 267 | 266 | 265 |

TABLE 3-continued

| A1 | B1 | C1 | D1 | A2 | B2 | C2 | D2 | A3 | B3 | C3 | D3 |
|----|----|----|----|----|----|----|----|----|----|----|----|
| 264 | 263 | 262 | 261 | 260 | 259 | 258 | 257 | 256 | 255 | 254 | 253 |
| 252 | 251 | 250 | 249 | 248 | 247 | 246 | 245 | 244 | 243 | 242 | 241 |
| 240 | 239 | 238 | 237 | 236 | 235 | 234 | 233 | 232 | 231 | 230 | 229 |
| 228 | 227 | 226 | 225 | 224 | 223 | 222 | 221 | 220 | 219 | 218 | 217 |
| 216 | 215 | 214 | 213 | 212 | 211 | 210 | 209 | 208 | 207 | 206 | 205 |
| 204 | 203 | 202 | 201 | 200 | 199 | 198 | 197 | 196 | 195 | 194 | 193 |
| 192 | 191 | 190 | 189 | 188 | 187 | 186 | 185 | 184 | 183 | 182 | 181 |
| 180 | 179 | 178 | 177 | 176 | 175 | 174 | 173 | 172 | 171 | 170 | 169 |
| 168 | 167 | 166 | 165 | 164 | 163 | 162 | 161 | 160 | 159 | 158 | 157 |
| 156 | 155 | 154 | 153 | 152 | 151 | 150 | 149 | 148 | 147 | 146 | 145 |
| 144 | 143 | 142 | 141 | 140 | 139 | 138 | 137 | 136 | 135 | 134 | 133 |
| 132 | 131 | 130 | 129 | 128 | 127 | 126 | 125 | 124 | 123 | 122 | 121 |
| 120 | 119 | 118 | 117 | 116 | 115 | 114 | 113 | 112 | 111 | 110 | 109 |
| 108 | 107 | 106 | 105 | 104 | 103 | 102 | 101 | 100 | 99 | 98 | 97 |
| 96 | 95 | 94 | 93 | 92 | 91 | 90 | 89 | 88 | 87 | 86 | 85 |
| 84 | 83 | 82 | 81 | 80 | 79 | 78 | 77 | 76 | 75 | 74 | 73 |
| 72 | 71 | 70 | 69 | 68 | 67 | 66 | 65 | 64 | 63 | 62 | 61 |
| 60 | 59 | 58 | 57 | 56 | 55 | 54 | 53 | 52 | 51 | 50 | 49 |
| 48 | 47 | 46 | 45 | 44 | 43 | 42 | 41 | 40 | 39 | 38 | 37 |
| 36 | 35 | 34 | 33 | 32 | 31 | 30 | 29 | 28 | 27 | 26 | 25 |
| 24 | 23 | 22 | 21 | 20 | 19 | 18 | 17 | 16 | 15 | 14 | 13 |
| 12 | 11 | 10 | 9 | 8 | 7 | 6 | 5 | 4 | 3 | 2 | 1 |

Figure 19:
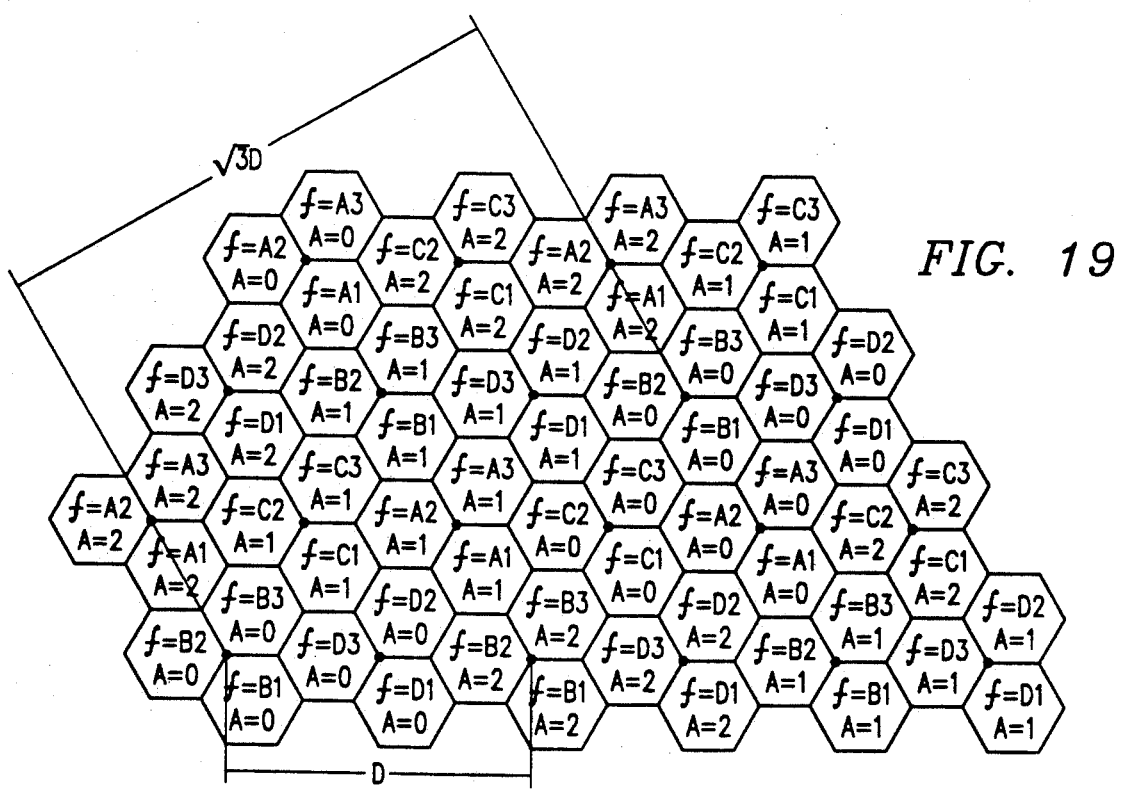
FIG. 19 illustrates transposition of frequency groups to avoid circumstances in which the received level of an adjacent channel may greatly exceed that of the desired channel in embodiments of the present invention.

Through design of a mobile telephone system must include measures to limit not only co-channel interference, but adjacent channel interference as well. Although receive filters at both the cell site and mobile unit significantly attenuate adjacent channel signals, it is advisable to avoid circumstances in which the received level of an adjacent channel may greatly exceed that of the desired channel. This design goal is accomplished in the Ericsson 4/12 cell plan by eliminating the use of adjacent frequencies in neighbor cells by transposing the D2 and D3 frequency groups in the voice channel allocation plan as shown in FIG. 19.

Voice Channel Assignments For Split Cell Sites

Figure 20:
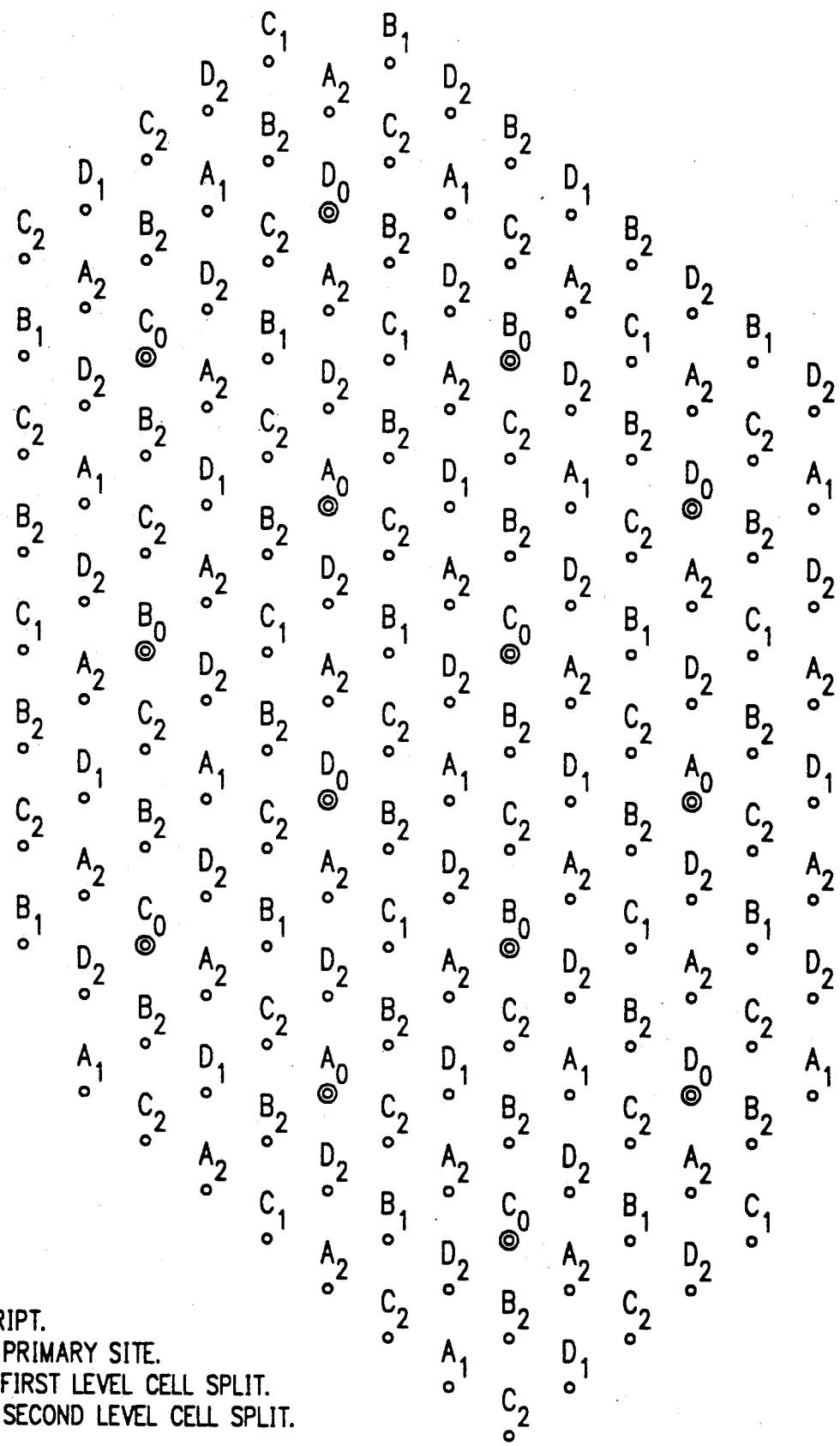
FIG. 20 illustrates a pattern assignment for the allocation of frequency groups in a 4/12 cell plan utilizing a 1:3 cell splitting scheme.

The pattern assignment for the allocation of frequency groups in a 4/12 cell plan utilizing a 1:3 cell splitting scheme discussed further below is shown in FIG. 20.

Underlay-Overlay Cell Concept—Multiple Cell Sizes

The underlay-overlay cell concept states that in a region where cells of multiple cell sizes are present, the cellular pattern may be viewed as the superimposition of a small-cell (overlay) pattern on top of a large-cell (underlay) pattern. The channel group assigned to any cell must be subdivided into a large-cell (underlay) group and a small-cell (overlay) group to meet the required C/I objectives in the system. The subdivision of a channel group into large and small-cell groups is governed by the channel requirements of each cell to meet traffic requirements.

The coverage area of the small-cells resident at the sites also servicing a large-cell coverage area must be restricted to ensure an appropriate small-cell reuse distance. This small-cell coverage restriction will maintain the D/R reuse distance in the system, thus allowing the use and deployment of additional voice channels in the large-cell pattern to increase traffic capacity.

Figure 21:
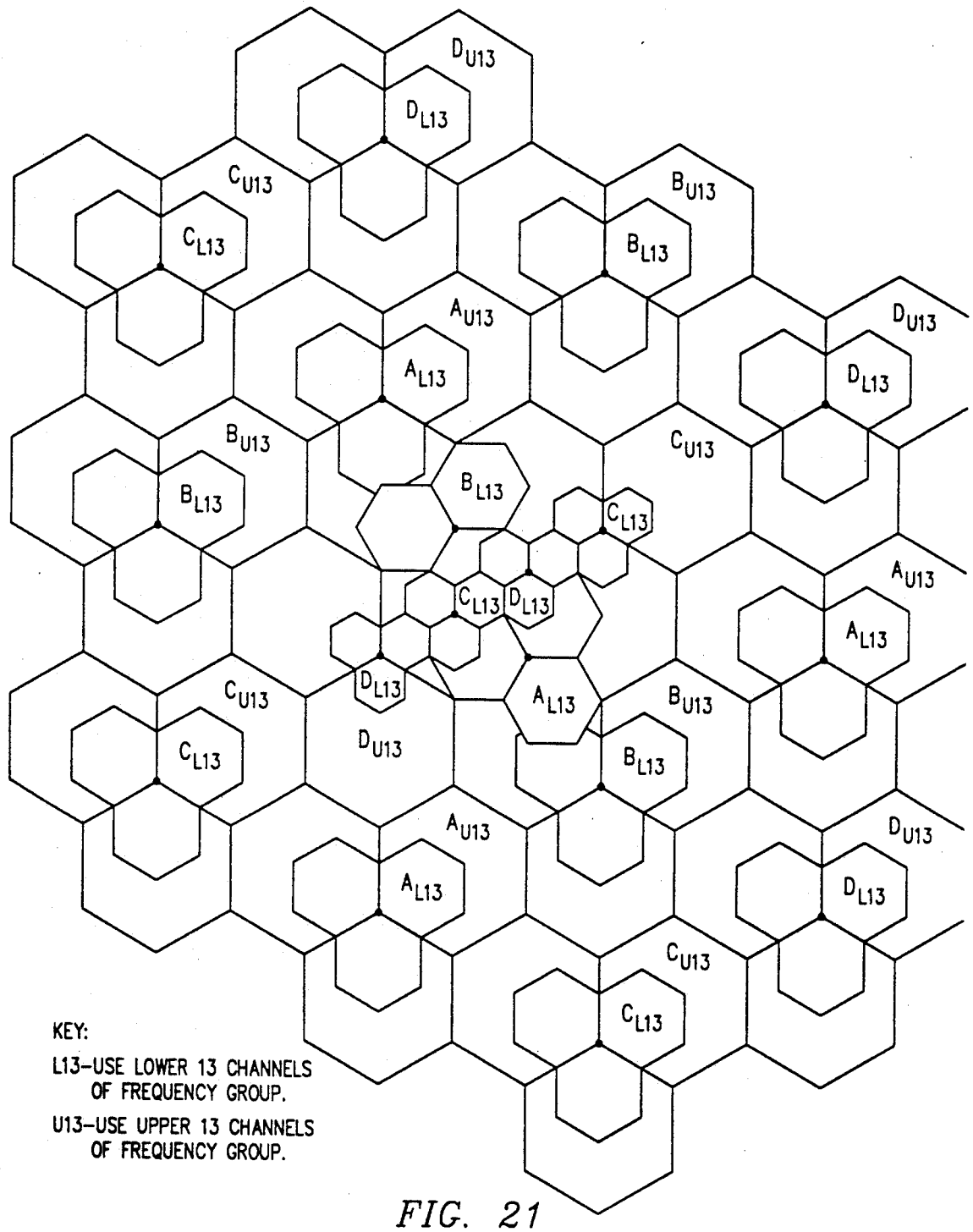
FIG. 21 illustrates channel group subdivisions and overlay cell coverage restrictions for a 4/12 underlay-4/12 overlay cell pattern with multiple cell sizes.

FIG. 21 illustrates channel group subdivisions and overlay cell coverage restrictions for a 4/12 underlay-4/12 overlay cell pattern with multiple cell sizes.

Underlay-Overlay Cell Concept—Reuse Partitioning

The frequency planning technique of reuse partitioning is defined to be the coexistence of two reuse patterns, operational on a per cell basis, in a system.

Given that the overlay cell has a reduced cell radius, its assigned frequency group may have a reduced co-channel reuse distance and still maintain an equal D/R ratio to that of the underlay cell pattern. The voice channels allocated to the overlay cells may then be rearranged into channel groups which conform to the overlay cell reuse pattern. Thus, a two tier reuse scheme is produced and the C/I performance of the underlay cell pattern is still maintained throughout the system.

Figure 22:
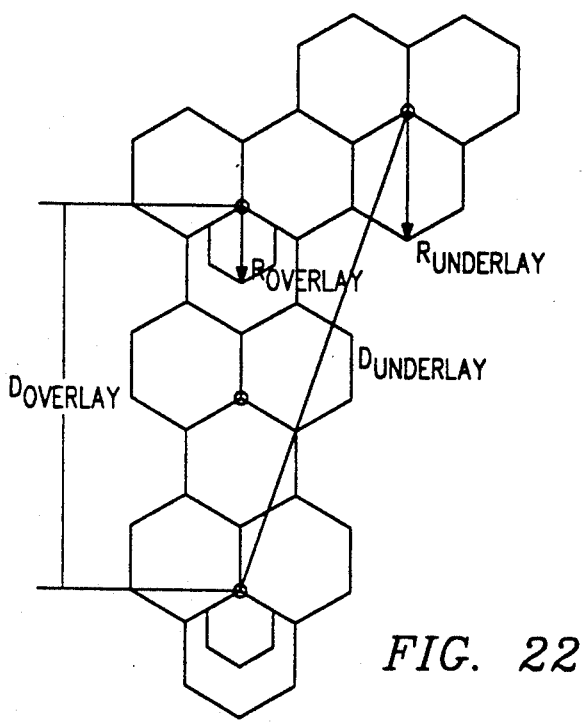
FIG. 22 illustrates a 7/21 underlay-4/12 overlay cell pattern utilizing reuse partitioning.

FIG. 22 illustrates a 7/21 underlay-4/12 overlay cell pattern utilizing reuse partitioning.

Supervisory Audio Tone

AMPS and TACS system employ a continuous out-of-band modulated audio tone known as the supervisory audio tone (SAT) for call supervision purposes.

The optimal allocation of the three (3) SATs at 5970, 6000, and 6030 Hz, will multiply the reuse distance ratio for supervision by the square root of 3.

This allocation scheme provides for an increased supervision reliability by reducing the probability of misinterpreted interference (co-channel or adjacent channel) both in the land-to-mobile and mobile-to-land path.

The pattern assignment for the supervisory audio tone in the Ericsson 4/12 cell plan is shown in FIG. 19. The co-channel reuse distance ratio multiplier of square root of 3 times D for supervision is also shown.

Control Channel Assignment

Figure 23:
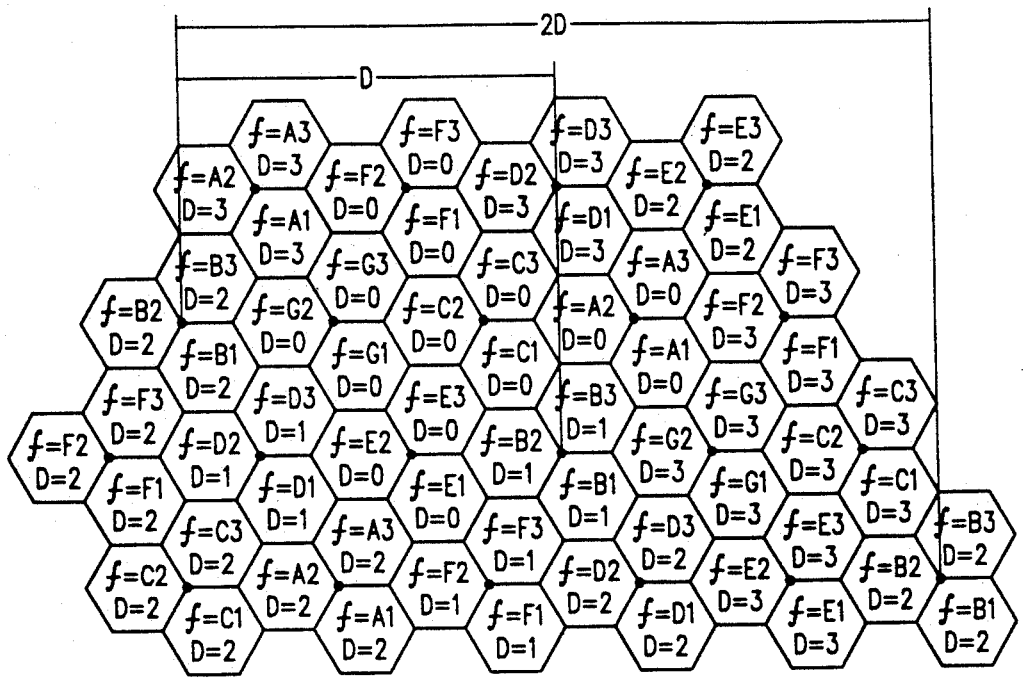
FIG. 23 illustrates a control channel allocation plan which has no adjacent control channel frequencies in neighbor cells.

Control channels in the Ericsson 4/12 cell plan are assigned in a standard 7/21 cell pattern. This pattern assignment ensures system reliability during system access. FIG. 23 illustrates a control channel allocation plan which has no adjacent control channel frequencies in neighbor cells. It should be noted that the channel spacing between voice and control channels should be maintained at a frequency separation compatible with the combining equipment being used. This separation should be verified on a per cell basis because of the use of a 7/21 cell pattern for control channels and a 4/12 cell pattern for voice channels.

Control Channel Assignments for Split Cell Sites

The pattern assignment for the allocation of control channels in a 4/12 cell plan utilizing a 1:3 cell splitting scheme discussed further below is shown in FIG. 24.

Digital Color Code

Cellular systems use a digitally coded forward control channel message format which contains a digital color code (DCC). This DCC is contained in the overhead system parameter words which are transmitted on the forward control channel. The DCC must be verified from the reverse control channel message transmitted by the mobile.

The four (4) DCCs multiply the reuse distance for system access supervision by two (2).

The pattern assignment for the digital color code in the Ericsson 4/12 cell pattern is shown in FIG. 23. The reuse distance ratio multiplier of 2D for DCC assignments is also shown.

Retune Scheme

A retune scheme involves an orderly and sequential process which minimizes intra-system interference during the transition stages of converting from a 7/21 cell plan to a 4/12 cell plan. The retune scheme specifies the order in which the radios at each affected site will be retuned beginning with the core area. Temporary voice channel frequencies will be assigned or appropriate channels will be blocked in the transition region until all sites may be tuned to their final 4/12 frequency assignments. This interim procedure is necessary to ensure an acceptable level of system performance during the retune.

Frequency Plan Evolution

The evolution of existing cellular systems from a 7/21 cell plan to a 4/12 cell plan may be implemented in an orderly fashion by utilizing the underlay-overlay cell concept with the frequency planning technique of reuse partitioning. The coverage radius of the overlay cells will be controlled by software parameters and ERP restrictions to 75% of the underlay cells' radii. The use of the underlay-overlay concept will thus allow the operator to increase capacity globally in the system while still maintaining the C/I performance and reuse distance of a 7/21 cell plan.

Figure 25:
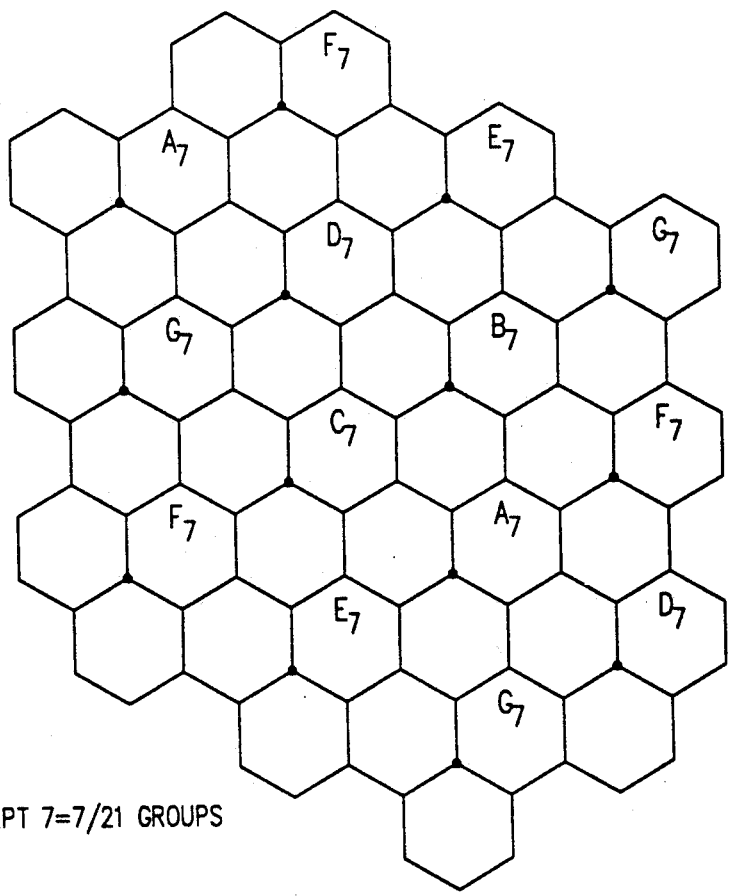
FIGS. 25-27 show the simulated evolution of a system which initially uses only the standard FCC A Band.
Figure 26:
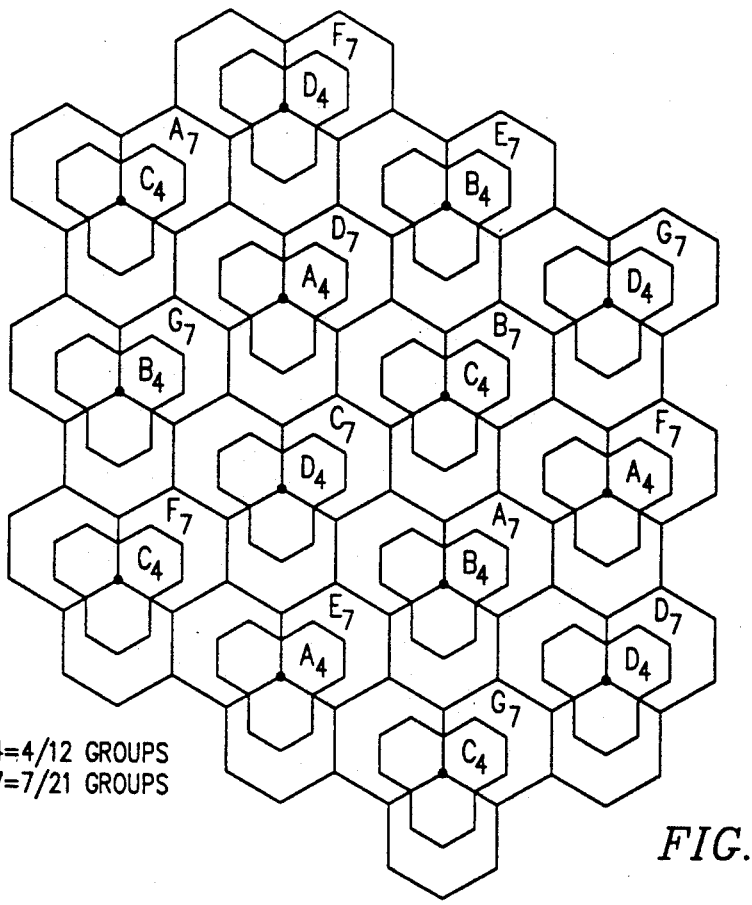
Figure 27:
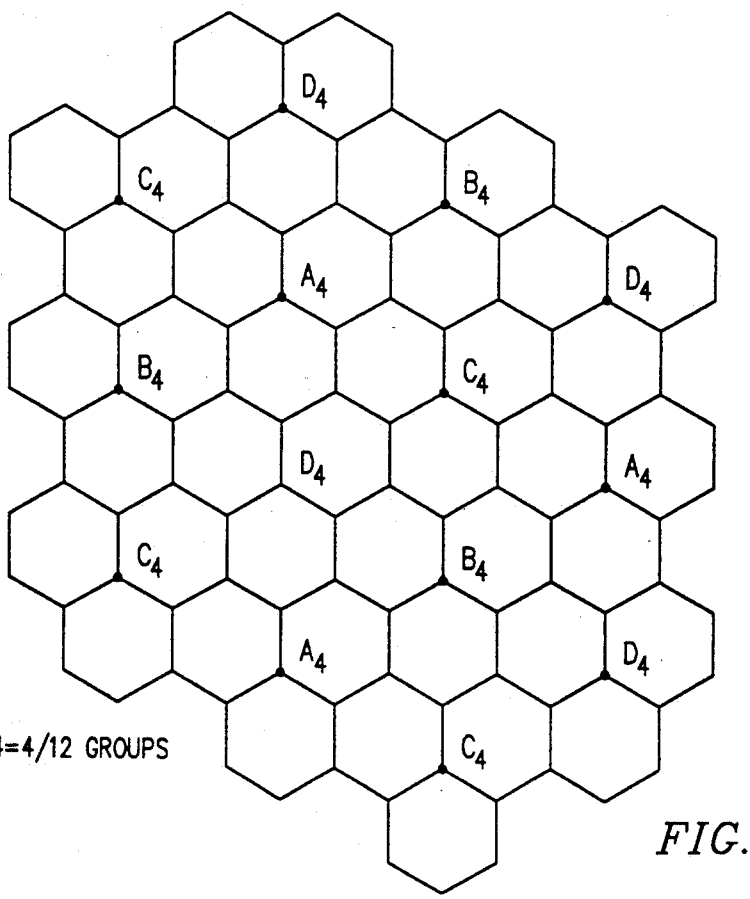

The simulated evolution of a system which initially uses only the standard FCC A Band is shown in FIGS. 25-27. The required rearrangement and assignment of voice channels into 7/21 and 4/12 frequency groups which use the FCC extended A Band is shown in Tables 4 to 7 immediately below:

TABLE 4

7/21 FREQUENCY ASSIGNMENTS
Frequency Group

| $A_1$ | $B_1$ | $C_1$ | $D_1$ | $E_1$ | $F_1$ | $G_1$ | $A_2$ | $B_2$ | $C_2$ | $D_2$ | $E_2$ | $F_2$ | $G_2$ | $A_3$ | $B_3$ | $C_3$ | $D_3$ | $E_3$ | $F_3$ | $G_3$ |
|---|---|---|---|---|---|---|---|---|---|---|---|---|---|---|---|---|---|---|---|---|
| 352 | 311 | 310 | 309 | 308 | 307 | 306 | 305 | 304 | 303 | 302 | 301 | 300 | 299 | 298 | 297 | 296 | 295 | 294 | 293 | 292 |
| 291 | 290 | 289 | 288 | 287 | 286 | 285 | 284 | 283 | 282 | 281 | 280 | 279 | 278 | 277 | 276 | 275 | 274 | 273 | 272 | 271 |
| 270 | 269 | 268 | 267 | 266 | 265 | 264 | 263 | 262 | 261 | 260 | 259 | 258 | 257 | 256 | 255 | 254 | 253 | 252 | 251 | 250 |
| 249 | 248 | 247 | 246 | 245 | 244 | 243 | 242 | 241 | 240 | 239 | 238 | 237 | 236 | 235 | 234 | 233 | 232 | 231 | 230 | 229 |
| 228 | 227 | 226 | 225 | 224 | 223 | 222 | 221 | 220 | 219 | 218 | 217 | 216 | 215 | 214 | 213 | 212 | 211 | 210 | 209 | 208 |
| 207 | 206 | 205 | 204 | 203 | 202 | 201 | 200 | 199 | 198 | 197 | 196 | 195 | 194 | 193 | 192 | 191 | 190 | 189 | 188 | 187 |
| 186 | 185 | 184 | 183 | 182 | 181 | 180 | 179 | 178 | 177 | 176 | 175 | 174 | 173 | 172 | 171 | 170 | 169 | 168 | 167 | 166 |
| 165 | 164 | 163 | 162 | 161 | 160 | 159 | 158 | 157 | 156 | 155 | 154 | 153 | 152 | 151 | 150 | 149 | 148 | 147 | 146 | 145 |
| 144 | 143 | 142 | 141 | 140 | 139 | 138 | 137 | 136 | 135 | 134 | 133 | 132 | 131 | 130 | 129 | 128 | 127 | 126 | 125 | 124 |
| 123 | 122 | 121 | 120 | 119 | 118 | 117 | 116 | 115 | 114 | 113 | 112 | 111 | 110 | 109 | 108 | 107 | 106 | 105 | 104 | 103 |
| 102 | 101 | 100 | 99 | 98 | 97 | 96 | 95 | 94 | 93 | 92 | 91 | 90 | 89 | 88 | 87 | 86 | 85 | 84 | 83 | 82 |
| 81 | 80 | 79 | 78 | 77 | 76 | 75 | 74 | 73 | 72 | 71 | 70 | 69 | 68 | 67 | 66 | 65 | 64 | 63 | 62 | 61 |
| 60 | 59 | 58 | 57 | 56 | 55 | 54 | 53 | 52 | 51 | 50 | 49 | 48 | 47 | 46 | 45 | 44 | 43 | 42 | 41 | 40 |
| 39 | 38 | 37 | 36 | 35 | 34 | 33 | 32 | 31 | 30 | 29 | 28 | 27 | 26 | 25 | 24 | 23 | 22 | 21 | 20 | 19 |
| 18 | 17 | 16 | 15 | 14 | 13 | 12 | 11 | 10 | 9 | 8 | 7 | 6 | 5 | 4 | 3 | 2 | 1 | . | . | . |

TABLE 5

7/21 UNDERLAY CELL FREQUENCY ASSIGNMENTS WITH REUSE PARTITIONING
Frequency Group

| $7A_1$ | $7B_1$ | $7C_1$ | $7D_1$ | $7E_1$ | $7F_1$ | $7G_1$ | $7A_2$ | $7B_2$ | $7C_2$ | $7D_2$ | $7E_2$ | $7F_2$ | $7G_2$ | $7A_3$ | $7B_3$ | $7C_3$ | $7D_3$ | $7E_3$ | $7F_3$ | $7G_3$ |
|---|---|---|---|---|---|---|---|---|---|---|---|---|---|---|---|---|---|---|---|---|
| 312 | 311 | 310 | 309 | 308 | 307 | 306 | 305 | 304 | 303 | 302 | 301 | 300 | 299 | 298 | 297 | 296 | 295 | 294 | 293 | 292 |
| 291 | 290 | 289 | 288 | 287 | 286 | 285 | 284 | 283 | 282 | 281 | 280 | 279 | 278 | 277 | 276 | 275 | 274 | 273 | 272 | 271 |
| 270 | 269 | 268 | 267 | 266 | 265 | 264 | 263 | 262 | 261 | 260 | 259 | 258 | 257 | 256 | 255 | 254 | 253 | 252 | 251 | 250 |
| 249 | 248 | 247 | 246 | 245 | 244 | 243 | 242 | 241 | 240 | 239 | 238 | 237 | 236 | 235 | 234 | 233 | 232 | 231 | 230 | 229 |
| 228 | 227 | 226 | 225 | 224 | 223 | 222 | 221 | 220 | 219 | 218 | 217 | 216 | 215 | 214 | 213 | 212 | 211 | 210 | 209 | 208 |
| 207 | 206 | 205 | 204 | 203 | 202 | 201 | 200 | 199 | 198 | 197 | 196 | 195 | 194 | 193 | 192 | 191 | 190 | 189 | 188 | 187 |
| 186 | 185 | 184 | 183 | 182 | 181 | 180 | 179 | 178 | 177 | 176 | 175 | 174 | 173 | 172 | 171 | 170 | 169 | 168 | 167 | 166 |
| 165 | 164 | 163 | 162 | 161 | 160 | 159 | 158 | 157 | 156 | 155 | 154 | 153 | 152 | 151 | 150 | 149 | 148 | 147 | 146 | 145 |
| 144 | 143 | 142 | 141 | 140 | 139 | 138 | 137 | 136 | 135 | 134 | 133 | 132 | 131 | 130 | 129 | 128 | 127 | 126 | 125 | 124 |
| 123 | 122 | 121 | 120 | 119 | 118 | 117 | 116 | 115 | 114 | 113 | 112 | 111 | 110 | 109 | 108 | 107 | 106 | 105 | 104 | 103 |
| 102 | 101 | 100 | 99 | 98 | 97 | 96 | 95 | 94 | 93 | 92 | 91 | 90 | 89 | 88 | 87 | 86 | 85 | 84 | 83 | 82 |
| 81 | 80 | 79 | 78 | 77 | 76 | 75 | 74 | 73 | 72 | 71 | 70 | 69 | 68 | 67 | 66 | 65 | 64 | 63 | 62 | 61 |
| 716 | 715 | 714 | 713 | 712 | 711 | 710 | 709 | 708 | 707 | 706 | 705 | 704 | 703 | 702 | 701 | 700 | 699 | 698 | 697 | 696 |
| 695 | 694 | 693 | 692 | 691 | 690 | 689 | 688 | 687 | 686 | 685 | 684 | 683 | 682 | 681 | 680 | 679 | 678 | 677 | 676 | 675 |
| 674 | 673 | 672 | 671 | 670 | 669 | 668 | 667 | . | . | . | . | . | . | . | . | . | . | . | . | . |

TABLE 6

4/12 OVERLAY CELL FREQUENCY ASSIGNMENTS WITH REUSE PARTITIONING

| \multicolumn{11}{c}{Frequency Group} |

| $4A_1$ | $4B_1$ | $4C_1$ | $4D_1$ | $4A_2$ | $4B_2$ | $4C_2$ | $4D_2$ | $4A_3$ | $4B_3$ | $4C_3$ | $4D_3$ |
|---|---|---|---|---|---|---|---|---|---|---|---|
| 60 | 59 | 58 | 57 | 56 | 55 | 54 | 53 | 52 | 51 | 50 | 49 |
| 48 | 47 | 46 | 45 | 44 | 43 | 42 | 41 | 40 | 39 | 38 | 37 |
| 36 | 35 | 34 | 33 | 32 | 31 | 30 | 29 | 28 | 27 | 26 | 25 |
| 24 | 23 | 22 | 21 | 20 | 19 | 18 | 17 | 16 | 15 | 14 | 13 |
| 12 | 11 | 10 | 9 | 8 | 7 | 6 | 5 | 4 | 3 | 2 | 1 |
| 1023 | 1022 | 1021 | 1020 | 1019 | 1018 | 1017 | 1016 | 1015 | 1014 | 1013 | 1012 |
| 1011 | 1010 | 1009 | 1008 | 1007 | 1006 | 1005 | 1004 | 1003 | 1002 | 1001 | 1000 |
| 999 | 998 | 997 | 996 | 995 | 994 | 993 | 992 | 991 | . | . | . |

TABLE 7

4/12 FREQUENCY ASSIGNMENTS

| \multicolumn{12}{c}{Frequency Group} |

| A1 | B1 | C1 | D1 | A2 | B2 | C2 | D2 | A3 | B3 | C3 | D3 |
|---|---|---|---|---|---|---|---|---|---|---|---|
| 312 | 311 | 310 | 309 | 308 | 307 | 306 | 305 | 304 | 303 | 302 | 301 |
| 300 | 299 | 298 | 297 | 296 | 295 | 294 | 293 | 292 | 291 | 290 | 289 |
| 288 | 287 | 286 | 285 | 284 | 283 | 282 | 281 | 280 | 279 | 278 | 277 |
| 276 | 275 | 274 | 273 | 272 | 271 | 270 | 269 | 268 | 267 | 266 | 265 |
| 264 | 263 | 262 | 261 | 260 | 259 | 258 | 257 | 256 | 255 | 254 | 553 |
| 252 | 251 | 250 | 249 | 248 | 247 | 246 | 245 | 244 | 243 | 242 | 241 |
| 240 | 239 | 238 | 237 | 236 | 235 | 234 | 233 | 232 | 231 | 230 | 229 |
| 228 | 227 | 226 | 225 | 224 | 223 | 222 | 221 | 220 | 219 | 218 | 217 |
| 216 | 215 | 214 | 213 | 212 | 211 | 210 | 209 | 208 | 207 | 206 | 205 |
| 204 | 203 | 202 | 201 | 200 | 199 | 198 | 197 | 196 | 195 | 194 | 193 |
| 192 | 191 | 190 | 189 | 188 | 187 | 186 | 185 | 184 | 183 | 182 | 181 |
| 180 | 179 | 178 | 177 | 176 | 175 | 174 | 173 | 172 | 171 | 170 | 169 |
| 168 | 167 | 166 | 165 | 164 | 163 | 162 | 161 | 160 | 159 | 158 | 157 |
| 156 | 155 | 154 | 153 | 152 | 151 | 150 | 149 | 148 | 147 | 146 | 145 |
| 144 | 143 | 142 | 141 | 140 | 139 | 138 | 137 | 136 | 135 | 134 | 133 |
| 132 | 131 | 130 | 129 | 128 | 127 | 126 | 125 | 124 | 123 | 122 | 121 |
| 120 | 119 | 118 | 117 | 116 | 115 | 114 | 113 | 112 | 111 | 110 | 109 |
| 108 | 107 | 106 | 105 | 104 | 103 | 102 | 101 | 100 | 99 | 98 | 97 |
| 96 | 95 | 94 | 93 | 92 | 91 | 90 | 89 | 88 | 87 | 86 | 85 |
| 84 | 83 | 82 | 81 | 80 | 79 | 78 | 77 | 76 | 75 | 74 | 73 |
| 72 | 71 | 70 | 69 | 68 | 67 | 66 | 65 | 64 | 63 | 62 | 61 |
| 60 | 59 | 58 | 57 | 56 | 55 | 54 | 53 | 52 | 51 | 50 | 49 |
| 48 | 47 | 46 | 45 | 44 | 43 | 42 | 41 | 40 | 39 | 38 | 37 |
| 36 | 35 | 34 | 33 | 32 | 31 | 30 | 29 | 28 | 27 | 26 | 25 |
| 24 | 23 | 22 | 21 | 20 | 19 | 18 | 17 | 16 | 15 | 14 | 13 |
| 12 | 11 | 10 | 9 | 8 | 7 | 6 | 5 | 4 | 3 | 2 | 1 |
| 1023 | 1022 | 1021 | 1020 | 1019 | 1018 | 1017 | 1016 | 1015 | 1014 | 1013 | 1012 |
| 1011 | 1010 | 1009 | 1008 | 1007 | 1006 | 1005 | 1004 | 1003 | 1002 | 1001 | 1000 |
| 999 | 998 | 997 | 996 | 995 | 994 | 993 | 992 | 991 | 716 | 715 | 714 |
| 713 | 712 | 711 | 710 | 709 | 708 | 707 | 706 | 705 | 704 | 703 | 702 |
| 701 | 700 | 699 | 698 | 697 | 696 | 695 | 694 | 693 | 692 | 691 | 690 |
| 689 | 688 | 687 | 686 | 685 | 684 | 683 | 682 | 681 | 680 | 679 | 678 |
| 677 | 676 | 675 | 674 | 673 | 672 | 671 | 670 | 669 | 668 | 667 | . |

The retune necessary to implement the simulated 7/21 underlay-4/12 overlay cell pattern with reuse partitioning from the initial system configuration will involve an initial retune of a maximum of three (3) voice channels in the 7/21 underlay cell pattern. This retune will be essential at all cell sites which use the overlay cell frequencies and are within one (1) reuse distance of the overlay cell. The control channel assignments will not be effected by the retune.

Once the capacity of the 7/21 underlay-4/12 overlay cell plan is exhausted, the system operator may then choose to introduce a cell pattern utilizing a 4/12 reuse scheme.

Cell Splitting

Eventually the traffic demand in some cell of a system will reach the cell's traffic-carrying capacity. The process called cell splitting implies the introduction and insertion of new cell sites between existing sites in the cell pattern. The cell splitting process revises cell boundaries so that the area formerly regarded as a single cell can now contain several cells. By reducing the area of each cell, cell splitting allows the system to adjust to a growing traffic demand density without any increase in spectrum allocation.

There are two (2) cell splitting plans currently used in the cellular industry, a 1:3 and a 1:4 cell split. Both of these cell splitting plans may be used in an Ericsson 4/12 cell plan.

1:3 Cell Split

Figure 28:
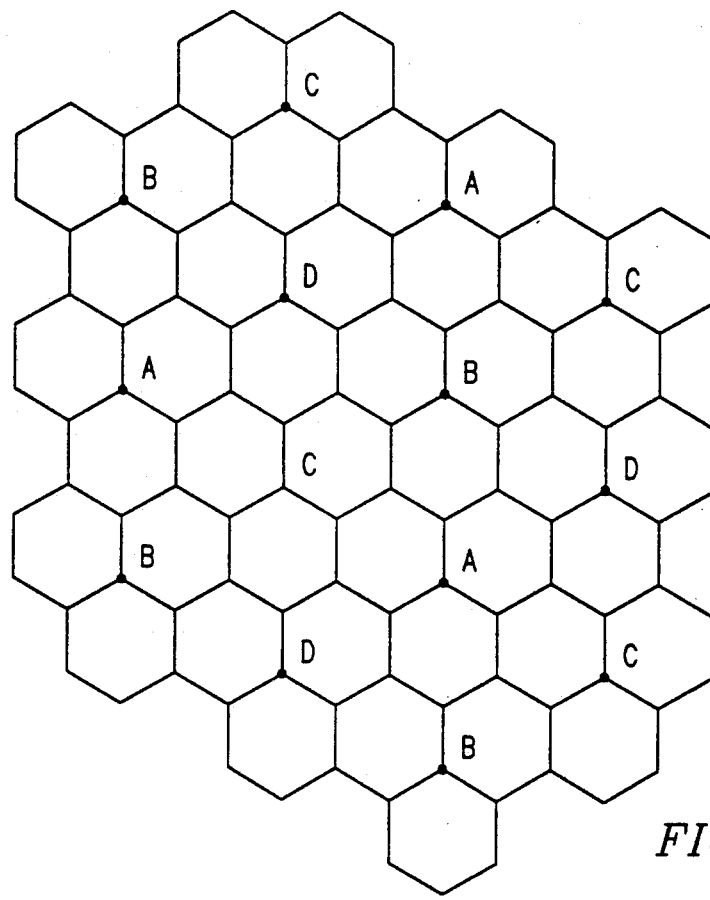
FIGS. 28-30 illustrate various cell splitting relationships.
Figure 29:
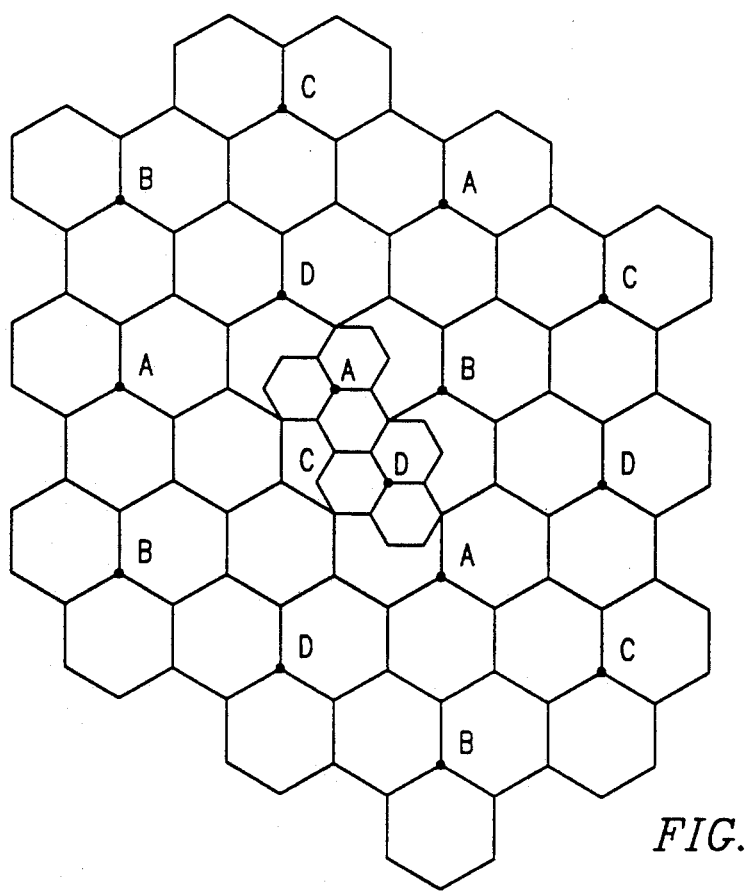
Figure 30:
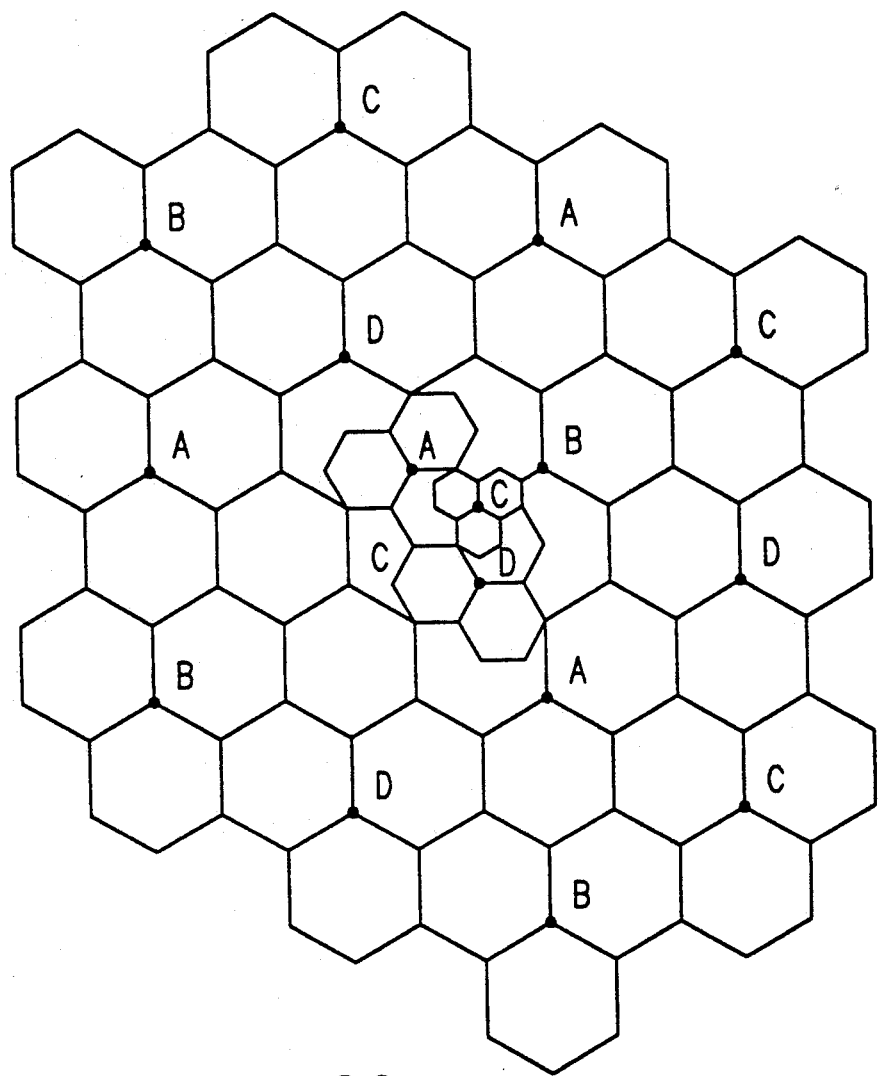

In a 1:3 cell splitting plan, the new sites are located midway between three (3) existing sites. The cell site density is increased by a factor of three (3) by reducing to one-third the nominal area previously covered by each of the existing sites. Each stage of cell splitting requires the channel assignments and antennas in the cell split cluster to be rotated by 30°. This rotation is necessary in order to provide coverage without any gaps or overlaps and consistent C/I performance in the cell split cluster. These relationships are shown in FIGS. 28-30. Utilizing a 1:3 cell splitting scheme will not alter channel assignments at the existing cell sites in the Ericsson 4/12 cell plan.

1:4 Cell Split

In a 1:4 cell splitting plan, the new sites are located midway between two (2) existing sites. The cell site density is increased by a factor of four (4) by reducing to one-fourth the nominal area previously covered by each of the existing sites. Each stage of cell splitting will not require a rotation of antennas. However, each cell split will alter the channel assignments at the existing cell sites.

Based upon all of the foregoing, it should now be clear that the frequency reuse cell plan according to the teachings of the present invention offers tremendous advantages over prior art plans. It should also be clear that a plan according to the present invention may be relatively easy to implement.

It is thus believed that the operation and construction of the present invention will be apparent from the foregoing description. While the embodiments shown and described have been characterized as preferred, it will be obvious that various changes and modifications therein without departing from the spirit and scope of the invention.

What is claimed is:

1. In a cellular radio communications system including a plurality of radio transceivers each of which are connected to antennas for communicating with a plurality of mobile subscriber units operating within said system, an antenna system comprising:
   a plurality of antenna sites spaced from one another throughout said system in a predetermined repeating pattern, each of said antenna sites operating on a specific group of radio frequencies to serve an associated plurality of hexagon-shaped cells within said system and in which no two contiguous sites use the same group of frequencies but frequency groups are reused among arrays of four sites; and
   means for implementing twelve groups of frequencies among each of said arrays of four antenna sites where each of said twelve groups of frequencies is comprised of N/12 channels, where N is the number of available voice channel frequencies in the cellular system.

2. A system as recited in claim 1, wherein each site lies along a first generally linear path extending in a first direction, comprising an i shift parameter direction, said first linear path being laterally spaced from adjacent generally parallel linear paths on which other sites are positioned, said sites being located on said parallel paths at positions intersected by second generally linear parallel paths extending in a second direction and extending at a non-orthogonal angle to said first direction, comprising a j shift parameter direction, and with each most nearly adjacent site which reuses the same frequencies being spaced from one another a first selected distance in said first i shift parameter direction and a second selected distance in a second j shift parameter direction, both distances being expressed in terms of integral multiples of the distance along said first and second directions between each adjacent site without regard to the frequencies used thereby, and wherein the shift parameter distances, i and j, between sites which reuse the same frequencies are two and zero, respectively.

3. A system as recited in claim 1, wherein said associated plurality of hexagon-shaped cells comprises a group of three cells.

4. A system as recited in claim 3, wherein each group of three cells is served by three groups of antennas mounted at a pointing angle of 120 degrees to one another.

5. A system as recited in claim 3, wherein said three hexagon-shaped cells in each group are arranged in a cloverleaf fashion with one side of each cell being generally contiguous to one side of each of the other two cells in said group and said antenna site being generally located at the point of intersection of each of said contiguous sides.

6. A system as recited in claim 1 wherein said specific group of frequencies in use at each site are divided into three frequency sub-groups, each sub-group containing 1/12 of the total number of said available voice channel frequencies in the system.

7. A system as recited in claim 4, wherein each of said three groups of antennas comprises at least one 60° transmit antenna and two diversity receive antennas all with the same pointing azimuths.

8. In a cellular radio communications system including a plurality of radio transceivers each of which are connected to antennas for communicating with a plurality of mobile subscriber units operating within said system, an antenna system comprising:
   a plurality of antenna sites spaced from one another throughout said system in a predetermined repeating pattern, each of which sites including antennas operating on a specific group of radio frequencies and each of which antenna sites serve an associated three hexagon-shaped cells within said system and in which no two contiguous sites use the same group of frequencies but frequency groups are reused among individual arrays of four sites; and
   means for implementing twelve groups of frequencies among each of said arrays of four antenna sites, each of said twelve groups consisting of N/12 channels, where N is the number of available frequencies in the system.

9. A system as recited in claim 8, wherein each antenna site is spaced from its adjacent site a first selected distance in a first i shift parameter direction and a second selected distance in a second j shift parameter direction at a non-orthogonal angle to said first i shift parameter direction, each of said sites being in linear alignment with other sites in the i direction, and wherein the sites which reuse the same frequencies are spaced from one another in the i shift parameter direction two time said first selected distance.

10. A system as recited in claim 8, wherein each of said associated three cells are served by a group of at least three antennas.

11. A system as recited in claim 10, wherein each group of three cells is served by groups of at least three antennas with each group mounted at a pointing angle of 120 degrees to one another.

12. A system as recited in claim 10, wherein said three cells in each group are arranged in a cloverleaf fashion with one side of each cell being generally contiguous to one side of each of the other two cells in said group and said site being generally located at the point of intersection of each of said contiguous sides.

13. A system as recited in claim 11, wherein each of said three groups of antennas comprises at least one 60° transmit antenna and at least two diversity receive antennas all with the same pointing azimuths.

* * * * *